US011245922B2

(12) United States Patent
Chen et al.

(10) Patent No.: US 11,245,922 B2
(45) Date of Patent: Feb. 8, 2022

(54) SHARED CANDIDATE LIST

(71) Applicant: MediaTek Inc., Hsinchu (TW)

(72) Inventors: Chun-Chia Chen, Hsinchu (TW);
Chih-Wei Hsu, Hsinchu (TW);
Tzu-Der Chuang, Hsinchu (TW);
Ching-Yeh Chen, Hsinchu (TW);
Yu-Wen Huang, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 16/541,627

(22) Filed: Aug. 15, 2019

(65) Prior Publication Data

US 2020/0059659 A1  Feb. 20, 2020

Related U.S. Application Data

(60) Provisional application No. 62/719,175, filed on Aug. 17, 2018, provisional application No. 62/733,101, filed on Sep. 19, 2018, provisional application No. 62/740,430, filed on Oct. 3, 2018, provisional application No. 62/789,566, filed on Jan. 8, 2019.

(51) Int. Cl.
| | |
|---|---|
| *H04N 19/56* | (2014.01) |
| *H04N 19/53* | (2014.01) |
| *H04N 19/96* | (2014.01) |
| *H04N 19/583* | (2014.01) |

(52) U.S. Cl.
CPC ............. *H04N 19/56* (2014.11); *H04N 19/53* (2014.11); *H04N 19/583* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 2014/0341284 A1 | 11/2014 | Kim et al. | |
| 2015/0071357 A1 | 3/2015 | Pang et al. | |
| 2016/0309156 A1* | 10/2016 | Park | H04N 19/119 |
| 2018/0048889 A1 | 2/2018 | Zhan et al. | |

(Continued)

FOREIGN PATENT DOCUMENTS

| | | |
|---|---|---|
| CN | 103430547 A | 12/2013 |
| EP | 2806636 A1 | 11/2014 |

(Continued)

OTHER PUBLICATIONS

Taiwan Intellectual Property Office, Office Action for Taiwan Patent Application No. 108129211, dated May 19, 2020.

(Continued)

*Primary Examiner* — James M Anderson, II

(74) *Attorney, Agent, or Firm* — Oblon, McClelland, Maier & Neustadt, L.L.P.

(57) ABSTRACT

A video coder that uses a shared candidate list to encode or decode multiple blocks of pixels within a shared boundary is provided. The video coder identifies a shared boundary encompassing a plurality of blocks of pixels of a current picture in a video sequence. The video coder identifies one or more prediction candidates as a shared candidate list based on neighbors of a region defined by the shared boundary. The video coder codes one or more blocks of pixels encompassed by the shared boundary by using one or more prediction candidates selected from the shared candidate list.

23 Claims, 16 Drawing Sheets

(56) References Cited

U.S. PATENT DOCUMENTS

2018/0084260 A1* 3/2018 Chien ................ H04N 19/105
2019/0373255 A1* 12/2019 Ye ...................... H04N 19/119

FOREIGN PATENT DOCUMENTS

WO    WO 2017042434 A1    3/2017
WO    WO 2017220164 A1    12/2017
WO    WO-2018066927 A1 *  4/2018  ........... H04N 19/105
WO    WO 2018129172 A1    7/2018

OTHER PUBLICATIONS

China National Intellectual Property Administration, International Search Report and Written Opinion for PCT/CN2019/101116, dated Nov. 19, 2019.
Combined Taiwanese Office Action and Search Report dated Apr. 16, 2021 in Taiwanese Patent Application No. 108129234 (with English translation of categories of cited documents), 15 pages.

* cited by examiner

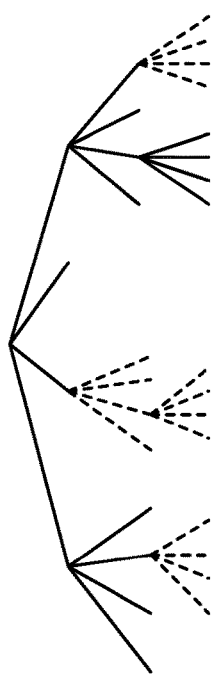
*FIG. 01*
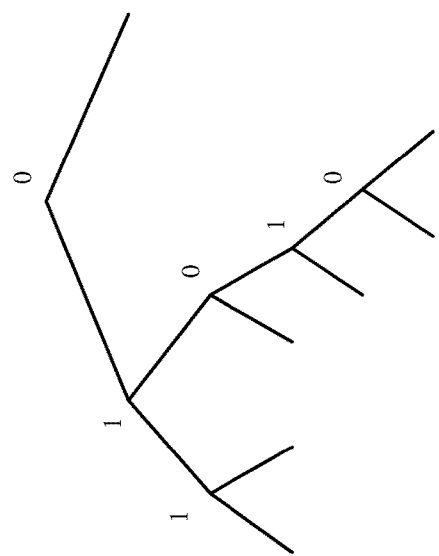
*FIG. 02*
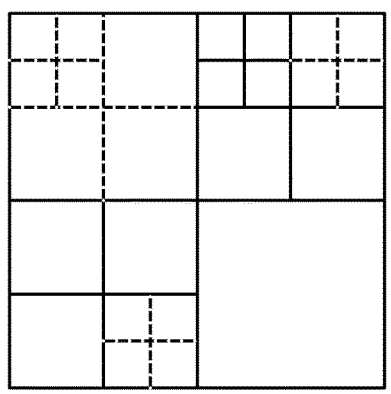
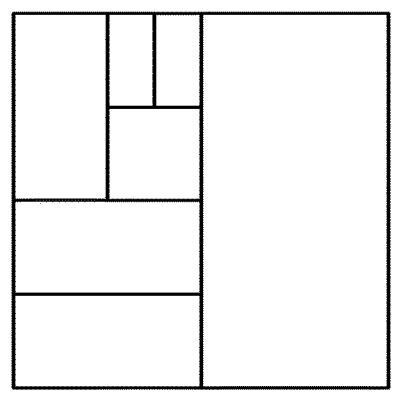

SHARED CANDIDATE LIST

CROSS REFERENCE TO RELATED PATENT APPLICATION(S)

The present disclosure is part of a non-provisional application that claims the priority benefit of U.S. Provisional Patent Application No. 62/719,175 filed on 17 Aug. 2018, U.S. Provisional Patent Application No. 62/733,101 filed on 19 Sep. 2018, U.S. Provisional Patent Application No. 62/740,430 filed on 3 Oct. 2018, and U.S. Provisional Patent Application No. 62/789,566 filed on 8 Jan. 2019. Contents of above-listed applications are herein incorporated by reference.

TECHNICAL FIELD

The present disclosure relates generally to video processing. In particular, the present disclosure relates to methods of using a shared candidate list to encode or decode multiple blocks of pixels within a shared boundary.

BACKGROUND

Unless otherwise indicated herein, approaches described in this section are not prior art to the claims listed below and are not admitted as prior art by inclusion in this section.

High-efficiency video coding (HEVC) is a video coding standard developed by the Joint Collaborative Team on Video Coding (JCT-VC). In HEVC, a coded picture is partitioned into non-overlapped square block regions represented by the coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. An intra (I) slice is decoded using intra prediction only. A predictive (P) slice is decoded using intra prediction or inter prediction using at most one motion vector and a reference index to predict the sample values of each block.

One or more prediction units (PUs) are specified for each coding unit (CU). The prediction unit, together with the associated CU syntax, works as a basic unit for signaling the predictor information. The specified prediction process is applied to predict the values of the associated pixel samples inside the PU. A CU can be split into one, two, or four PUs, depending on the selected PU type. HEVC defines eight types of partitions for dividing a CU into PUs.

A CU can be further partitioned using the residual quadtree (RQT) structure for representing the associated prediction residual signal. The leaf nodes of the RQT correspond to the resulting transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and quantized coefficient values are coded in the bitstream. The minimum and maximum transform block sizes are specified in the sequence parameter set.

In the HEVC, the terms coding tree block (CTB), coding block (CB), prediction block (PB), and transform block (TB) are defined to refer to the 2-D sample array of one-color component from the associated CTU, CU, PU, and TU, respectively. A CTU thus consists of one luma CTB, two chroma CTBs, and associated syntax elements in a color picture not coded using three separate color planes. The signaled coding tree partitioning is generally applied to both luma blocks and chroma blocks, although some exceptions apply when certain minimum size constraints are encountered.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provides a video coder that uses a shared candidate list to code (for example, encode or decode) multiple blocks of pixels within a shared boundary. The video coder identifies a shared boundary encompassing a plurality of blocks of pixels of a current picture in a video sequence. The video coder identifies one or more prediction candidates as a shared candidate list based on spatial or temporal neighbors of a region defined by the shared boundary. The video coder codes one or more blocks of pixels encompassed by the shared boundary by using one or more prediction candidates selected from the shared candidate list. When coding the one or more blocks of pixels, a first blocks of pixels and a second blocks of pixels may be coded in parallel by using the shared candidate list.

In some embodiments, the region defined by the shared boundary is a portion of a coding tree unit (CTU), the shared boundary corresponds to a root of a sub-tree of the CTU, and the blocks of pixels being coded corresponds to leaf CUs of the CTU. In some embodiments, the shared candidate list includes motion vectors that are used for coding neighboring blocks of the region defined by the shared boundary. The region may correspond to a CU and the shared candidate list is a merge or AMVP candidate list of the CU. The motion vectors being included by the shared candidate list may include merge or AMVP candidates of various types, such as affine candidates, IBC candidates, sub-PU candidates, history-based candidates, non-adjacent candidates, etc.

In some embodiments, the shared boundary is identified by traversing a coding tree unit (CTU) that is split into a hierarchy of coding units (CUs) to identify a CU that is larger than or equal to a threshold and that the CU is a parent CU to a child CU that is smaller than the threshold. In some embodiments, the shared boundary is identified by traversing a coding tree unit (CTU) that is split into a hierarchy of coding units (CUs) to identify a CU that is smaller than or equal to a threshold and that the CU is a child CU to a parent CU that is larger than the threshold.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 1 illustrates a coding tree built on a quadtree (QT) split structure that represents the partitioning of a coding tree unit (CTU) into CUs.

FIG. 2 conceptually illustrates partitioning of a coding unit (CU) by binary tree split.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Partitioning Structures

In HEVC, a picture consists of slices, and a slice consists of CTUs. A CTU is a square of size 8×8, 16×16, 32×32, and 64×64. One CTU is partitioned into several coding units (CU). A quadtree structure is used to partition the CTU. CTU size is M×M (M is one of the values of 64, 32, or 16). The CTU can be either a single CU or be split into 4 units of sizes of M/2×M/2, which are coding tree nodes. If units are leaf nodes, they become CUs. Otherwise, the quadtree can be further split until the size for a node reaches the minimum CU size specified in the SPS. FIG. 1 illustrates splitting CTU as a quadtree. The solid lines are CU boundaries. One or more PU (prediction units) exists in each CU.

Coupled with the CU, the PUs are basic blocks for sharing the prediction information. Inside each PU, the same prediction process is applied. A CU can be split into 1, 2, or 4 PUs according to the PU partitioning type. The PU may only be split once. Alternatively, the binary tree (BT) partitioning structure may be used. Specifically, a block can be split into 2 smaller blocks recursively. The symmetric horizontal and vertical splitting are the most efficient and simple splitting types. In some embodiments, only these two splitting types are used. The binary tree partitioning process can be split recursively until the width or height for a split block reaches the minimum block width or height that can be defined in high level syntax in the video bitstream.

FIG. 2 shows an example of splitting process (left) and its binary tree (right). In each splitting, non-leaf node of the binary tree, a flag denotes whether horizontal or vertical is used, 0 indicates horizontal splitting and 1 indicates vertical splitting. The binary tree splitting structure can be used for partitioning a CTU into CUs, i.e., the root node is a CTU and the leaf nodes are CUs. And for simplification, as another embodiment, there is no further partitioning from CU to PU. That means CU equal to PU, therefore, it equals that the leaf node of the binary tree is the basic unit for prediction.

Figure 3:
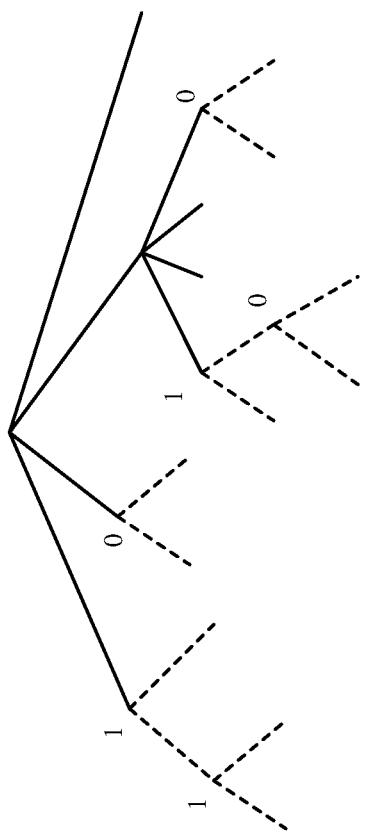
FIG. 3 conceptually illustrates partitioning a CU by both quadtree split and binary tree split.
Figure 3:
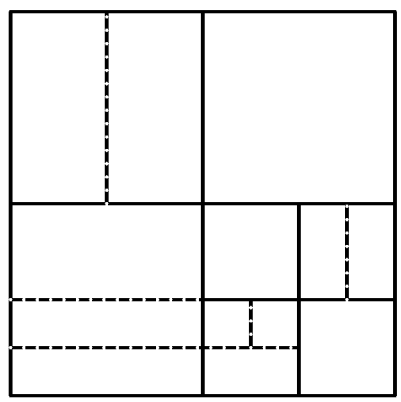

In some embodiments, a QTBT structure (quadtree plus binary tree structure) is used. It combines the quadtree and binary tree. In the QTBT structure, firstly, a block is partitioned by a quadtree splitting process, the quadtree (QT) splitting process can be iterated until the size reaches the minimum leaf node size. Secondly, If the leaf quadtree block is not larger than the maximum allowed binary tree root node size, the leaf quadtree block can be further split into binary tree (BT) partitioning, the binary splitting can be iterated until the width or height for the splitting block reaches the minimum allowed width or height or the binary splitting depth reaches the maximum allowed depth. FIG. 3 shows an example of QTBT structure. The QTBT structure can be used for partitioning a CTU into CUs, i.e., the root node is a CTU which is partitioned into multiple CUs by a QTBT structure, and the CUs are further processed by prediction and transform coding. And for simplification, as another embodiment, there is no further partitioning from CU to PU. That means CU equal to PU, therefore, it equals that the leaf node of the QTBT tree is the basic unit for prediction.

For I slices, the QTBT structure is applied separately to luma and chroma. For P and B slice, the QTBT structure is applied simultaneously to both luma and chroma (except when chroma reaches certain minimum sizes). In other words, in I slice, the QTBT-structured block partitioning trees differs between the luma CTB and the two chroma CTBs. Specifically, the luma CTB has QTBT-structured block partitioning, and the two chroma Coding Tree Unit (CTB) has another QTBT-structured block partitioning.

Flexible CU structure like Quad-Tree-Binary-Tree (QTBT) shows good coding performance compared to Quad-Tree (QT) structure in HEVC. In QTBT, as shown in FIG. 3 a CTU is firstly partitioned by a quad-tree structure.

The quad-tree leaf nodes are further partitioned by a binary-tree structure. To recursively partition a block into two smaller blocks, besides the conventional symmetric horizontal and vertical splitting types, the asymmetric horizontal and vertical splitting types can also be selected. After constructing the binary tree structure, binary-tree leaf nodes are denoted as CUs, which are used for prediction and transform without any further partitioning.

To further support more partition shapes to achieve more flexible partitioning, triple tree (TT) partitioning method is designed to capture objects which locate in the block center while quad-tree (QT) and binary tree (BT) partitioning methods always split along the block center.

Multi-Type-Tree (MTT) block partitioning extends the concept of the two-level tree structure in QTBT by allowing both the binary tree and triple tree partitioning methods in the second level of MTT. The two levels of trees in MTT are called region tree (RT) and prediction tree (PT) respectively. The first level RT is always quad-tree (QT) partitioning, and the second level PT may be either binary tree (BT) partitioning or triple tree (TT) partitioning. For example, a CTU is firstly partitioned by RT, which is QT partitioning, and each RT leaf node may be further split by PT, which is either BT or TT partitioning. A block partitioned by PT may be further split with PT until a maximum PT depth is reached, for example, a block may be first partitioned by vertical BT partitioning to generate a left sub-block and a right sub-block, and the left sub-block is further split by horizontal TT partitioning while the right sub-block is further split by horizontal BT partitioning. A PT leaf node is the basic CU for prediction and transform and will not be further split.

Figure 4:
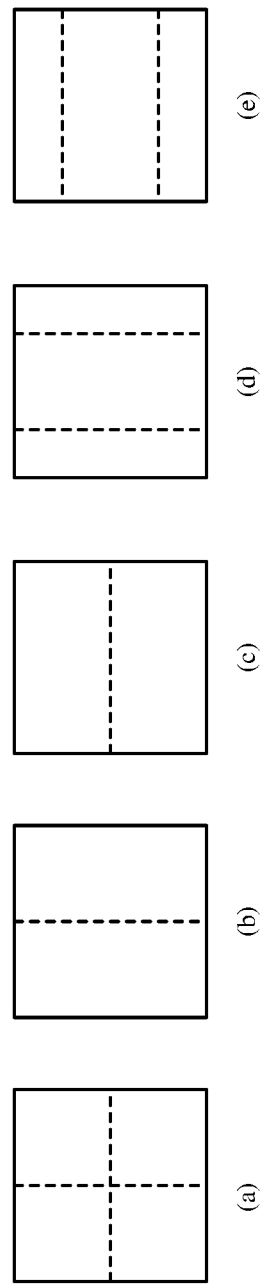
FIG. 4 illustrates several split types or modes for partitioning a CTU in an MTT structure.

FIG. 4 illustrates several split types or modes (a)-(e) for partitioning a CTU in an MTT structure. Split types (a) (b) and (c) correspond to quad-tree split, vertical binary tree split, and horizontal binary tree split, respectively. Split types (d) and (e) are referred to as triple-tree (or ternary tree) split types that divide a block into three smaller blocks. The three smaller blocks from the ternary-tree split have reduced sizes in one spatial dimension while keeping the same size in the other spatial dimension. The triple tree partitioning method may provide capability to faster localize small object along block boundaries, by allowing one-quarter partitioning vertically or horizontally.

Figure 5:
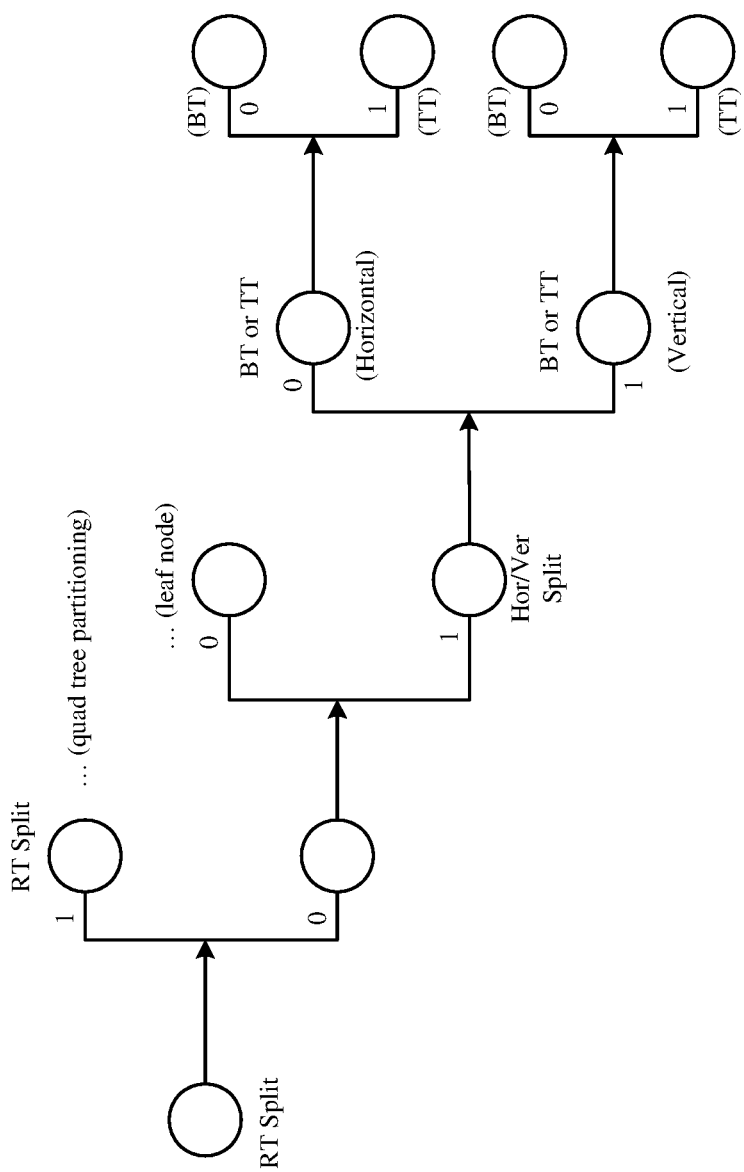
FIG. 5 illustrates a decision tree for signaling the partition structure of a CTU in some embodiments.

FIG. 5 illustrates an example of tree-type signaling for block partitioning according to MTT block partitioning. RT signaling may be similar to the quad-tree signaling in QTBT block partitioning. For signaling a PT node, one additional bin is signaled to indicate whether it is a binary tree partitioning or triple tree partitioning. For a block split by RT, a first bin is signaled to indicate whether there is another RT split, if the block is not further split by RT (i.e. the first bin is 0), a second bin is signaled to indicate whether there is a PT split. If the block is not further split by PT (i.e. the second bin is 0), then this block is a leaf node. If the block is further split by PT (i.e. the second bin is 1), a third bin is sent to indicate horizontal or vertical partitioning followed by a fourth bin for distinguishing binary tree (BT) or triple tree (TT) partitioning.

After constructing the MTT block partition, MTT leaf nodes are CUs, which are used for prediction and transform without any further partitioning. In MTT, the tree structure is coded separately for luma and chroma in I slice and is applied simultaneously to both luma and chroma (except when certain minimum sizes are reached for chroma) in P and B slice. That is to say that, in I slice, the luma CTB has its QTBT-structured block partitioning, and the two chroma CTBs has another QTBT-structured block partitioning.

II. Candidates for Inter-Prediction Modes
a. Merge Mode and AMVP Mode

To achieve the best coding efficiency of hybrid coding architecture, HEVC employs intra-prediction and/or inter-prediction modes for each PU. For intra-prediction modes, the spatial neighboring reconstructed pixels can be used to generate the directional predictions in 35 directions. For inter-prediction modes, motion information is used to reconstruct temporal reference frames, which are used to generate motion compensated predictions. Motion information may include motion vectors, motion vector predictors, motion vector differences, reference indices for selecting reference frames, etc.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the inter prediction direction to specify the prediction directions among bi-prediction, and uni-prediction which are list 0 (L0) and list 1 (L1), accompanied with the reference frame index for each list are also encoded and transmitted.

When a PU is coded in either Skip or Merge mode, no motion information is transmitted except the Merge index of the selected candidate. That is because the Skip and Merge modes utilize motion inference methods (MV=MVP+MVD where MVD is zero) to obtain the motion information from spatially neighboring blocks (spatial candidates) or a temporal block (temporal candidate) located in a co-located picture where the co-located picture is the first reference picture in list 0 or list 1, which is signaled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

Figure 6:
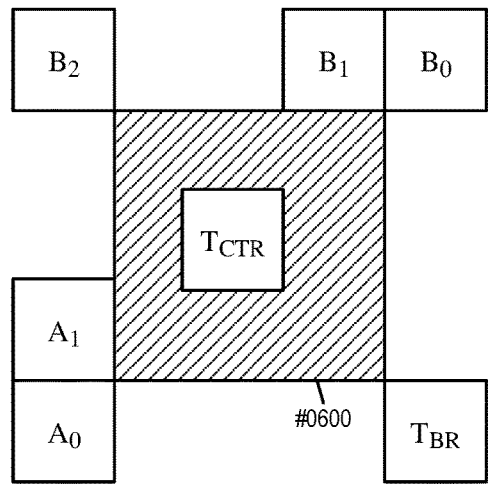
FIG. 6 shows the MVP candidates set for inter-prediction modes.

FIG. 6 shows the MVP candidates set for inter-prediction modes (i.e., skip, merge, and AMVP). The figure shows a current block 600 of a video picture or frame being encoded or decoded. The current block 600 (which can be a PU or a CU) refers to neighboring blocks to derive the spatial and temporal MVPs as an MVP list or candidate list for AMVP mode, merge mode or skip mode.

For AMVP mode, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. Therefore, after the derivation process of the two spatial MVPs and one temporal MVP, only the first two MVPs can be included in the candidate list. If after removing redundancy, the number of available MVPs is less than two, zero vector candidates are added to the candidates list.

For skip mode and merge mode, up to four spatial merge indices are derived from $A_0$, $A_1$, $B_0$ and $B_1$, and one temporal merge index is derived from $T_{BR}$ or $T_{CTR}$ ($T_{BR}$ is used first, if $T_{BR}$ is not available, $T_{CTR}$ is used instead). If any of the four spatial merge index is not available, the position $B_2$ is used to derive merge index as a replacement. After the deriving four spatial merge indices and one temporal merge index, redundant merge indices are removed. If the number of non-redundant merge indices is less than five, additional candidates may be derived from original candidates and added to the candidates list. There are three types of derived candidates:

1. Combined bi-predictive merge candidate (derived candidate type 1)
2. Scaled bi-predictive merge candidate (derived candidate type 2)
3. Zero vector merge/AMVP candidate (derived candidate type 3)

Figure 7:
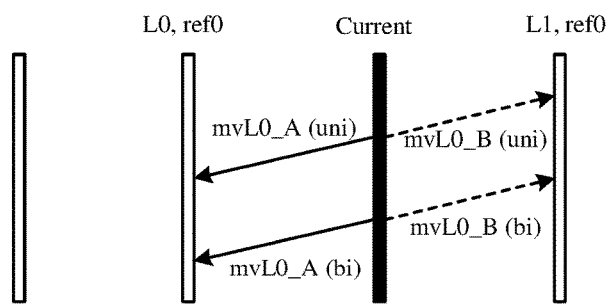
FIG. 7 illustrates a merge candidates list that includes combined bi-predictive merge candidates.

For derived candidate type 1, combined bi-predictive merge candidates are created by combining original merge candidates. Specifically, if the current slice is a B slice, a further merge candidate can be generated by combining candidates from List 0 and List 1. FIG. 7 illustrates a merge candidates list that includes combined bi-predictive merge candidates. As illustrated, two original candidates having mvL0 (the motion vector in list 0) and refIdxL0 (the reference picture index in list 0) or mvL1 (the motion vector in list 1) and refIdxL1 (the reference picture index in list 1), are used to create bi-predictive Merge candidates.

Figures 8, 9:
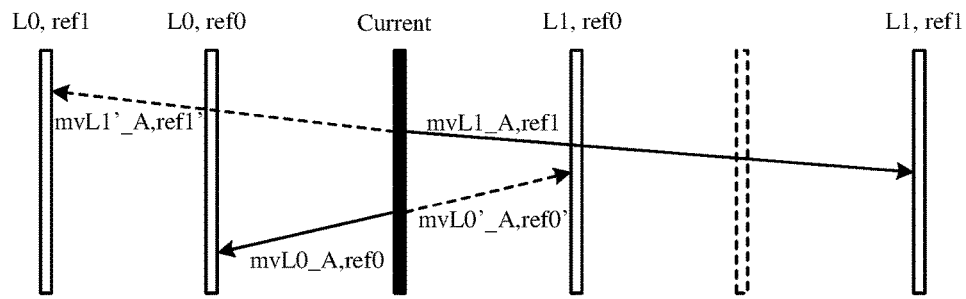
FIG. 8 illustrates a merge candidates list that includes scaled merge candidates.
FIG. 9 illustrates an example in which zero vector candidates are added to a merge candidates list or an AMVP candidates list.

For derived candidate type 2, scaled merge candidates are created by scaling original merge candidates. FIG. 8 illustrates a merge candidates list that includes scaled merge candidates. As illustrated, an original merge candidate has mvLX (the motion vector in list X, X can be 0 or 1) and refIdxLX (the reference picture index in list X, X can be 0 or 1). For example, an original candidate A is a list 0 uni-predicted MV with mvL0_A and reference picture index ref0. Candidate A is initially copied to list L1 as having reference picture index ref0'. The scaled MV mvL0'_A is calculated by scaling mvL0_A based on ref0 and ref0'. A scaled bi-predictive Merge candidate having mvL0_A and ref0 in list L0 and mvL0'_A and ref0' in list L1 is created and added to the merge candidates list. Likewise, a scaled bi-predictive merge candidate which has mvL1'_A and ref1' in List 0 and mvL1_A, ref1 in List 1 is created and added to the merge candidates list.

For derived candidate type 3, zero vector candidates are created by combining zero vectors and reference indices. If a created zero vector candidate is not a duplicate, it is added to the merge/AMVP candidates list. FIG. 9 illustrates an example in which zero vector candidates are added to a merge candidates list or an AMVP candidates list.

b. Sub-PU Temporal Motion Vector Prediction (ATMVP)

The ATMVP (Advanced Temporal Motion Vector Prediction) mode (or also called as Sub-PU Temporal Motion Vector Prediction (SbTMVP)) is a Sub-PU based mode for merge candidate. ATMVP mode uses a spatial neighbor to obtain an initial vector that is used to obtain the coordinate of the collocated block on the collocated picture. The sub-CU (usually 4×4 or 8×8) motion information of the collocated block on the collocated picture are retrieved and filled into sub-CU (usually 4×4 or 8×8) motion buffer of current merge candidate. There are several implementations of ATMVP. ATMVP is described in: Joint Video Exploration Team (JVET) of ITU-T SG 16 WP 3 and ISO/IEC JTC 1/SC 29/WG 11: 3rd Meeting: Geneva, CH, 26 May-1 Jun. 2016, Title: "Algorithm Description of Joint Exploration Test Model 3". ATMVP is also described in: Joint Video Experts Team (JVET) of ITU-T SG 16 WP 3 and ISO/IEC JTC 1/SC 29/WG 11 11th Meeting: Ljubljana, SI, 10-18 Jul. 2018, JVET-K0346-v3, Title: "CE4-related: One simplified design of advanced temporal motion vector prediction (ATMVP)".

c. Spatial-Temporal Motion Vector Prediction (STMVP)

The STMVP mode is a Sub-PU based mode for merge candidate. The motion vectors of the sub-PUs are generated recursively in raster scan order. The derivation of MV for current sub-PU identifies two spatial neighbors and one temporal neighbor before MV scaling. After retrieving and scaling the MVs, all available motion vectors (up to 3) are averaged and is assigned as the motion vector of the current sub-PU. STMVP is described in: Joint Video Exploration Team (JVET) of ITU-T SG 16 WP 3 and ISO/IEC JTC 1/SC 29/WG 11: 3rd Meeting: Geneva, CH, 26 May-1 Jun. 2016, Title: "Algorithm Description of Joint Exploration Test Model 3", Specifically Section 2.3.1.2: Spatial-temporal motion vector prediction (STMVP).

d. History-Based Merge Mode and AMVP

A video coder implementing history-based merge mode may store some previous CU's merge candidates in a history array. For the CU currently being encoded or decoded, the video coder may use one or more candidates inside the history array to enhance the original merge mode candidates. The history-based method is also applicable to AMVP candidate list. History-based Merge mode is described in: Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0104, "CE4-related: History-based Motion Vector Prediction".

e. Non-Adjacent Merge Mode and AMVP

A non-adjacent merge candidate uses some spatial candidates far away from the current CU. The Non-adjacent-based method may also be applied to AMVP candidate list. An example of Non-Adjacent Merge mode is shown in: Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0228, Title: "CE 4-2.1: Adding non-adjacent spatial merge candidates". An example of Non-Adjacent Merge Candidate is described in: Joint Video Experts Team (JVET) of ITU-T SG 16 WP 3 and ISO/IEC JTC 1/SC 29/WG 11, 11th Meeting: Ljubljana, SI, 10-18 Jul. 2018, Document: JVET-K0286, Title: "CE4: Additional merge candidates (Test 4.2.13)"

f. Affine Merge Mode

HEVC uses only translation motion model for motion compensation prediction. There are many other types of motions in the real world, such as zoom-in and zoom-out, rotation, perspective motions, and other irregular motions. Some of these other types of motions may be represented by affine transformation or affine motion, which preserves points, straight lines and planes. An affine transformation does not necessarily preserve angles between lines or distances between points, but it does preserve ratios of distances between points lying on a straight line. When an affine motion block is moving, the motion vector field of the block can be described by two control point motion vectors or four parameters as the following:

$$\begin{cases} x' = ax + by + e \\ y' = -bx + ay + f \\ vx = x - x' \\ vy = y - y' \end{cases} \overset{\Delta}{\Rightarrow} \begin{cases} vx = (1-a)x - by - e \\ vy = (1-a)y + bx - f \end{cases}$$

Figure 10:
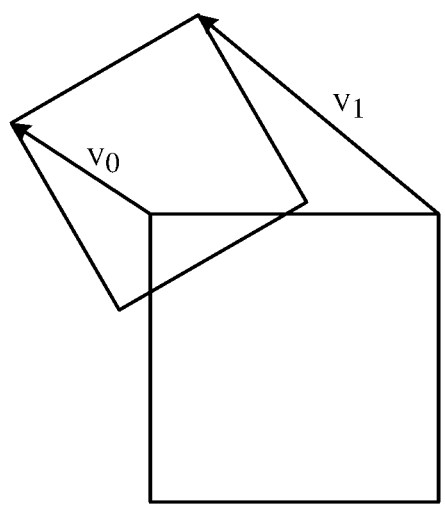
FIG. 10 illustrates a four parameter affine motion model.

The transformed block is a rectangular block. The motion vector field of each point in this moving block can be described by the following equation:

$$\begin{cases} v_x = \dfrac{(v_{1x} - v_{0x})}{w}x - \dfrac{(v_{1y} - v_{0y})}{w}y + v_{0x} \\ v_y = \dfrac{(v_{1y} - v_{0y})}{w}x + \dfrac{(v_{1x} - v_{0x})}{w}y + v_{0y} \end{cases}$$

Where ($v_{0x}$, $v_{0y}$) is the control point motion vector on top left corner, and ($v_{1x}$, $v_{1y}$) is another control point motion vector on above right corner of the block. In some embodiments, for a inter mode coded CU, when the CU size is equal to or larger than 16×16, an affine_flag is signaled to indicate whether the affine inter mode is applied or not. If the current CU is in affine inter mode, a candidate MVP pair list is built using the neighbor valid reconstructed blocks. FIG. 10 illustrates a four parameter affine motion model.

Figure 11:
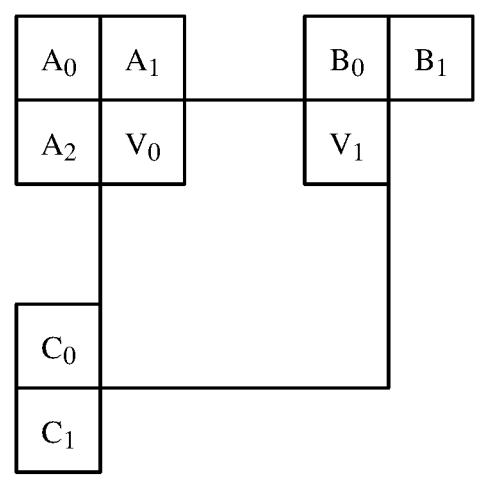
FIG. 11 illustrates MVP derivation for affine inter mode.

FIG. 11 illustrates MVP derivation for affine inter mode. As shown in FIG. 11, the $v_0$ is selected from the motion vectors of the block $A_0$, $A_0$ or $A_2$, and the $v_1$ is selected from the motion vectors of the block $B_0$ and $B_1$. The index of candidate MVP pair is signaled in the bit stream. The MV difference (MVD) of the two control points are coded in the bitstream.

In some embodiments, if the current PU is a merge PU, the neighboring five blocks (C0, B0, B1, C1, and A0 blocks in FIG. 11) are checked whether one of them is affine inter mode or affine merge mode. If yes, an affine_flag is signaled to indicate whether the current PU is affine mode. When the current PU is coded in affine merge mode, the first block is coded by affine mode from valid neighbor reconstructed blocks. The selection order for the candidate block is from left, above, above right, left bottom to above left (C0→B0→B1→C1→A0) as shown in FIG. 11. The affine parameter of the first affine coded block is used to derive the $v_0$ and $v_1$ for the current PU.

g. Current Picture Referencing (CPR)

Current picture referencing (CPR) is also referred to as intra block copy (IBC). A CPR (or IBC) motion vector is one that refers to the already-reconstructed reference samples in the current picture. A CPR-coded CU is signalled as an inter coded block. The luma motion (or block) vector of a CPR-coded CU must be in integer precision. The chroma motion vector is clipped to integer precision as well. When combined with AMVR, the CPR mode can switch between 1-pel and 4-pel motion vector precisions. The current picture is placed at the end of the reference picture list L0. To reduce memory consumption and decoder complexity, the CPR in VTM3 allows only the reconstructed portion of the current CTU to be used. This restriction allows the CPR mode to be implemented using local on-chip memory for hardware implementations.

At the encoder side, hash-based motion estimation is performed for CPR. The encoder performs RD check for blocks with either width or height no larger than 16 luma samples. For non-merge mode, the block vector search is performed using hash-based search first. If hash search does not return valid candidate, block matching based local search will be performed. In the hash-based search, hash key matching (32-bit CRC) between the current block and a reference block is extended to all allowed block sizes. The hash key calculation for every position in the current picture is based on 4×4 sub-blocks. For the current block of a larger size, a hash key is determined to match that of the reference block when all the hash keys of all 4×4 sub-blocks match the hash keys in the corresponding reference locations. If hash keys of multiple reference blocks are found to match that of the current block, the block vector costs of each matched reference are calculated and the one with the minimum cost is selected.

In block matching search, the search range is set to be N samples to the left and on top of the current block within the current CTU. At the beginning of a CTU, the value of N is initialized to 128 if there is no temporal reference picture. The value of N is initialized to 64 if there is at least one temporal reference picture. A hash hit ratio is defined as the percentage of samples in the CTU that found a match using hash-based search. While encoding the current CTU, if the hash hit ratio is below 5%, N is reduced by half.

III. Shared Candidate List

To simplify the codec operation complexity, some embodiments provide a method of using a shared candidate list to encode or decode multiple blocks of pixels. A candidates list refers to merge mode or AMVP mode candidate list, or other type of prediction candidate list (such as DMVR or bi-lateral refinement candidate list, affine merge mode, sub-block merge mode, affine inter/AMVP mode, IBC merge, IBC AMVP). A shared candidate list is a candidate list that is generated based on a boundary that is bigger than a leaf CU (e.g. a parent CU, or one root of a sub-tree in QTBT or QTBTTT Tree, or one node of QT tree), and the generated candidate list can be shared for all leaf CUs inside the boundary or inside the sub-tree.

In some embodiments, a shared candidate list is a candidate list that is shared by CUs within or encompassed by a common shared boundary, also referred to as a shared boundary. For some embodiments, a "shared boundary" is defined as a rectangular area of minimum-blocks (a minimum-block is usually 4×4) that are aligned inside a picture. Every CU inside the "shared boundary" may use a common shared candidate list that is generated based on the "shared boundary". Specifically, the candidates of the shared candidate list includes spatial neighbor positions and the temporal neighboring positions that are based on the "shared boundary", or the region defined by the shared boundary. The shared boundary may be a square block or a non-square block. The size/depth/width/height of the shared boundary may be signaled in a bitstream at sequence-level, picture-level, or slice-level.

Figure 12:
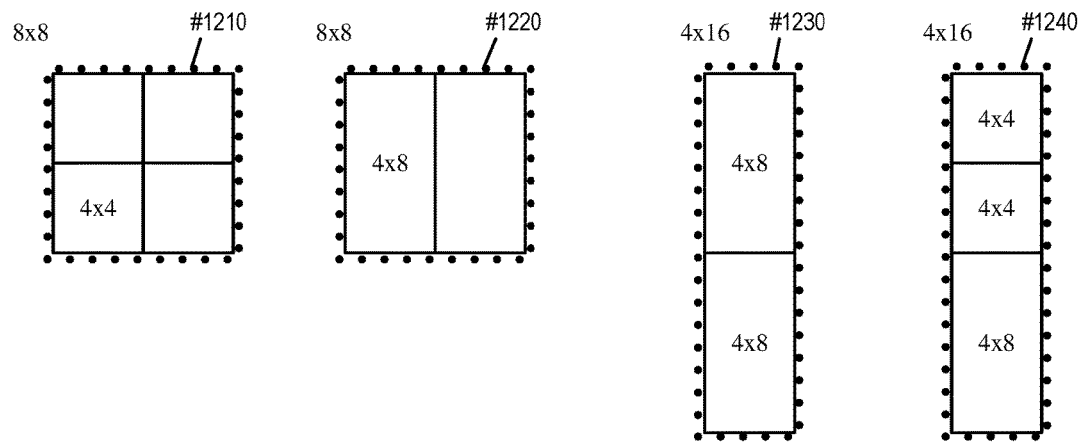
FIG. 12 illustrates several examples of share boundaries that are used to define or identify shared candidate lists.

FIG. 12 illustrates several examples of share boundaries that are used to define or identify shared candidate lists. The examples include: a square shared boundary 1210 that corresponds to a 8×8 CU that is QT split into four 4×4 CUs; a square shared boundary 1220 that corresponds to a 8×8 CU that is BT split into two 4×8 CUs; a rectangular shared boundary 1230 that corresponds to a 4×16 root CU that is BT split into two 4×8 CUs; and a rectangular shared boundary 1240 that corresponds to a 4×16 CU that is TT split into two 4×4 CUs and one 4×8 CU. The CU that corresponds to a shared boundary is also referred to as the root CU of the shared boundary.

Figure 13:
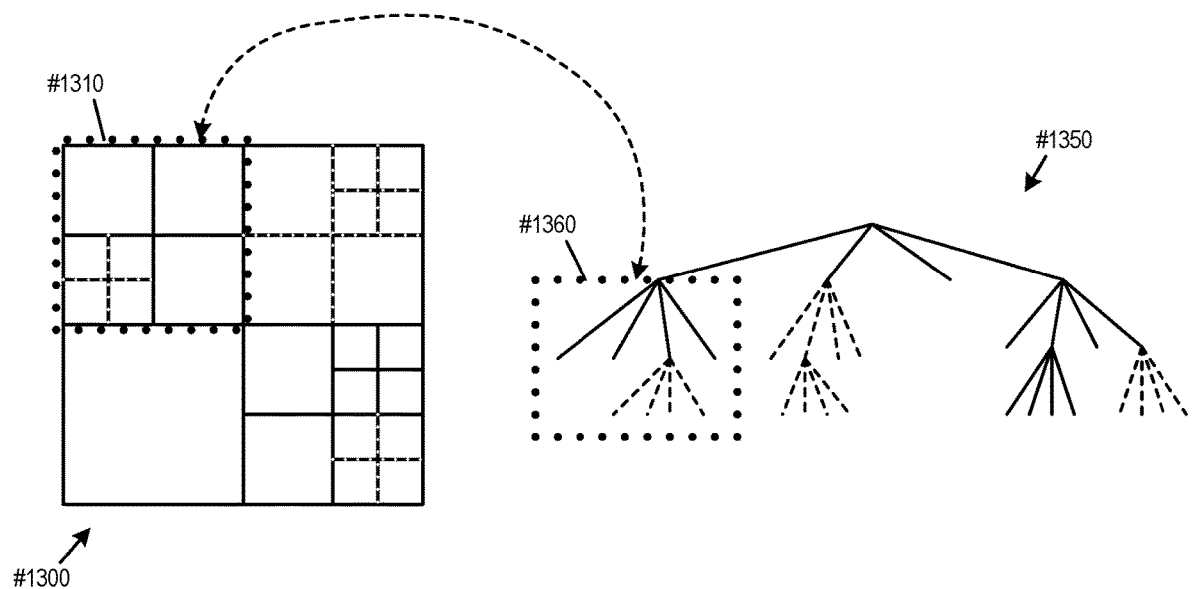
FIG. 13 illustrates a sub-tree of a split tree that correspond to CUs in a shared boundary that may be coded by a shared candidate list.

In some embodiments, a shared candidate list is a candidate list that is shared by CUs within a sub-tree. A "sub-tree" may refer to a sub-tree of QTBT, QTBTTT, or a split tree of another type. FIG. 13 illustrates a sub-tree of a split tree that correspond to CUs in a shared boundary that may be coded by a shared candidate list. The figure illustrates a CTU 1300 whose split structure is represented by a hierarchical tree 1350, which is a QTBT or QTBTTT split tree. Within the CTU 1300, a shared boundary 1310 defines a root CU, which is split into several sub-CUs of various split depths. The sub-CUs encompassed by the shared boundary 1310 correspond to nodes in a sub-tree 1360 in the split tree 1350, and leaf nodes in the sub-tree 1360 correspond to leaf CUs in the shared boundary 1310. In other words, the shared candidate list is shared by leaf nodes of the sub-tree 1360.

The shared candidate list can be generated based on a shared-block-boundary, e.g., a root CU boundary such as the shared boundary 1310 or the sub-tree 1360. The shared candidate list is re-used for some or all leaf CUs inside the sub-tree. The shared candidate list is generated for the root of the sub-tree, that is, the spatial neighbor positions and the temporal neighboring positions of the candidates of the shared candidate list are identified based on the rectangular boundary (or shared boundary) of the root CU or the sub-tree.

The candidates of the shared candidate list are prediction candidates that are identified based on spatial or temporal neighbors of a region defined by the shared boundary. One or more CUs encompassed by the shared boundary are then coded by using one or more prediction candidates selected from the shared candidate list.

Figure 14:
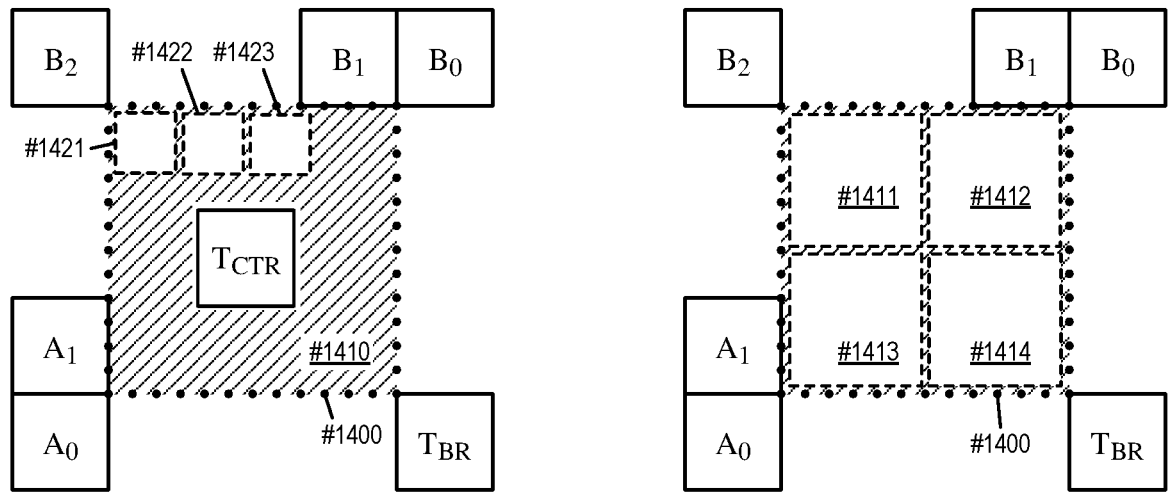
FIG. 14 illustrates a shared boundary that is used to identify a shared candidate list.

FIG. 14 illustrates a shared boundary 1400 that is used to identify a shared candidate list. The shared boundary 1400 defines a region 1410. The region 1410 may correspond to a CU. The region 1410 may be part of a split tree or CTU (e.g., BT, QT, MTT, etc.) and may be split into sub-CUs such as CUs 1411, 1412, 1413, and 1414. A sub-CU maybe a leaf CU that cannot be further split. A sub-CU may also be split into sub-CUs of greater split depths until leaf CUs are reached. In the example, the region 1410 (or a root CU that correspond to the region 1410) defined by the shared boundary 1400 is split into several leaf CUs, including leaf CUs 1421, 1422, and 1423.

The leaf CUs 1421, 1422, and 1423 are all coded by using the shared candidate list that is identified or defined based on the shared boundary 1400. The shared candidate list may be a merge mode list, AMVP list, IBC merge list, IBC AMVP List, or a prediction candidate list of another type. The share candidate list may include prediction candidates that are derived (e.g., inherited) from neighbors of the region 1410, e.g., spatial MVPs from spatial neighbors $A_0$, $A_1$, $B_0$, $B_1$, $B_2$ and temporal MVPs from temporal neighbors $T_{BR}$, $T_{CTR}$. Generally, the shared candidate list may include merge mode, AMVP mode candidates, IBC merge mode candidates, IBC AMVP mode candidates, affine merge mode candidates, sub-block merge mode candidates, affine AMVP mode candidates, or prediction candidates of other types. The shared candidate list may also include one or more CPR or IBC candidates that refer to already-reconstructed reference samples in the current picture.

Some embodiments of the disclosure provide methods for identifying the shared boundary. In some embodiments, a CU size threshold for identifying the shared boundary SHARED_THD is defined. For any leaf CU, the largest root CU with CU size<=SHARED_THD is used as the shared sub-tree root, or the root of the sub-tree that use a shared candidate list. In the example of FIG. 12, for the shared candidate list at shared boundary 1240, two 4×4 CU and one 4×8 CU belongs to a same 4×16 CU. In the example, the SHARED_THD is 64, the 4×16 CU (size 64) is therefore the root of the "shared sub-tree" and its boundary is the shared boundary 1240 (because the region defined by the shared boundary 1240 is the 4×16 CU). The merge list is therefore generated based on the 4×16 CU and shared by all child CUs (two 4×4 CUs and one 4×8 CU in this example) of the 4×16 CU.

Figure 15A:
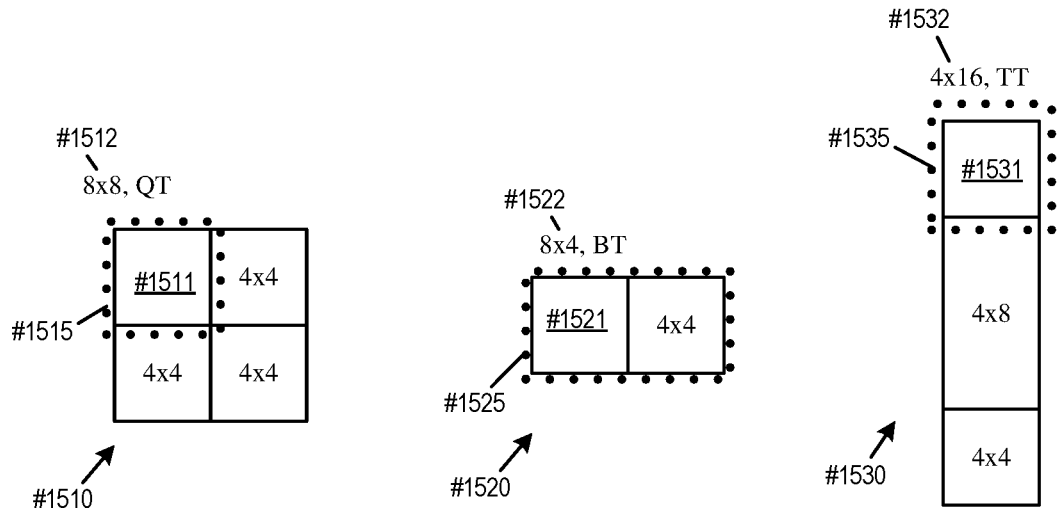
FIG. 15a and FIG. 15b illustrates using a CU size threshold to identify a shared boundary for a shared candidate list.
Figure 15B:
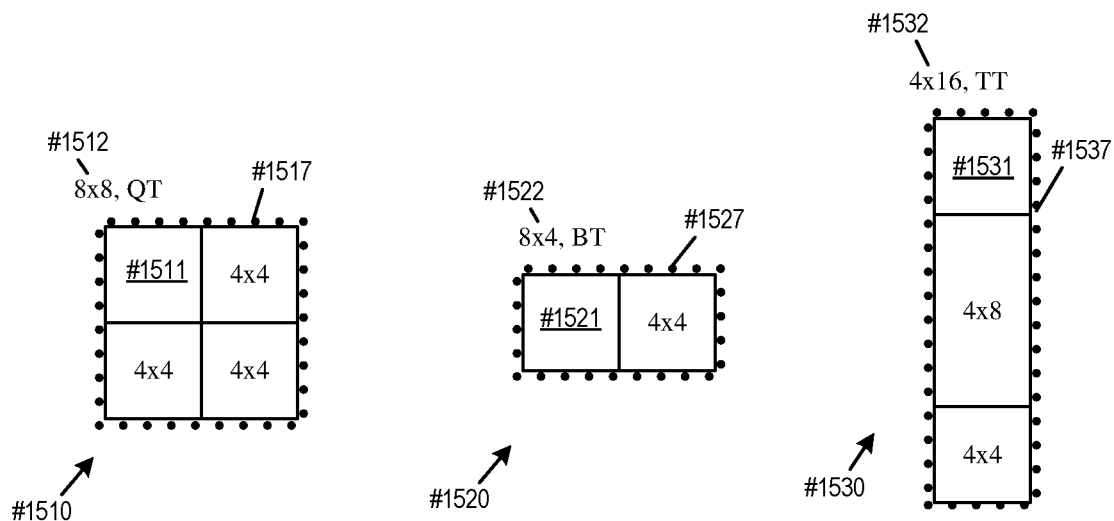

FIG. 15*a* and FIG. 15*b* illustrates using a CU size threshold to identify a shared boundary for a shared candidate list. The example uses 32 as the CU size threshold (SHARED_THD). In some embodiments, identifying the shared boundary involves traversing a CTU to identify a CU that is smaller than or equal to a threshold and that the CU is a child CU to a parent CU that is larger than the threshold. In some embodiments, identifying the shared boundary involves traversing a CTU to identify a CU that is larger than or equal to the threshold and that the CU is a parent CU to a child CU that is smaller than the threshold. The figure illustrates identifying shared boundaries in three CTUs or CUs 1510, 1520, and 1530.

FIG. 15*a* illustrates identifying share boundaries by identifying a CU that is smaller than or equal to SHARED_THD (32) and that the identified CU is a child CU to a parent CU that is larger than SHARED_THD. The video coder may traverse each of the CTUs from leaf CUs toward the CTU root.

For the CTU or CU 1510, the traversal encounters a 4×4 CU 1511 whose size 16 is smaller than SHARED_THD 32, and that the CU 1512 is a QT child to an 8×8 CU 1512 whose size 64 is larger than 32. As a result, the video coder identifies the 4×4 CU 1511 as a root CU for a shared candidate list and its boundaries 1515 as the shared boundary in the embodiment illustrated in FIG. 15*a*.

For the CTU or CU 1520, the traversal encounters an 4×4 CU 1521 whose size 16 is smaller than 32. The 4×4 CU 1521 is a BT child of an 8×4 CU 1522, whose size 32 is not larger than 32. The traversal continues to the 8×4 CU 1522, whose size is equal to 32. Consequently, the video coder identifies the 8×4 CU 1522 as the root CU of a shared candidate list and its boundaries 1525 as the shared boundary in the embodiment illustrated in FIG. 15*a*.

For the CTU or CU 1530, the traversal encounters a 4×4 CU 1531 whose size 16 is smaller than 32, and that the CU 1531 is a TT child to an 4×16 CU 1532 whose size 64 is larger than 32. As a result, the video coder identifies the 4×4 CU 1531 as a root CU for a shared candidate list and its boundaries 1535 as the shared boundary in the embodiment illustrated in FIG. 15*a*.

FIG. 15*b* illustrates identifying share boundaries by identifying a CU that is larger than or equal to SHARED_THD and that the identified CU is a parent CU to a child CU that is smaller than the SHARED_THD. The video coder may traverse each of the CTUs from the CTU root toward the leaf CUs.

For the CTU or CU 1510, the traversal encounters the 8×8 CU 1512, whose size 64 is larger than 32. The 8×8 CU 1512 is the QT parent to the 4×4 CU 1511, whose size 16 is smaller than 32. As a result, the video coder identifies the 8×8 CU 1512 as a root CU for a shared candidate list and its boundaries 1517 as the shared boundary in the embodiment illustrated in FIG. 15*b*.

For the CTU or CU 1520, the traversal encounters the 8×4 CU 1522, whose size is equal to 32. The 8×4 CU 1522 is the BT parent to the 4×4 CU 1521, whose size 16 is smaller than 32. As a result, the video coder identifies the 8×4 CU 1522 as a root CU for a shared candidate list and its boundaries 1527 as the shared boundary in the embodiment illustrated in FIG. 15*b*.

For the CTU or CU 1530, the traversal encounters the 4×16 CU 1532, whose size 64 is larger than 32. The 4×16 CU 1532 is the TT parent to the 4×4 CU 1531, whose size 16 is smaller than 32. As a result, the video coder identifies the 4×16 CU 1532 as a root CU for a shared candidate list and its boundaries 1537 as the shared boundary in the embodiment illustrated in FIG. 15*b*.

In some embodiments, the CU size threshold for identifying the shared boundary SHARED_THD is fixed and pre-defined for all picture sizes and all bitstreams. In some embodiments, SHARED_THD may vary according to the picture size, that is, for different picture sizes, the SHARED_THD may be different. In some embodiments, SHARED_THD may be signaled from encoder to decoder. The minimum sizes of units in the signaling of SHARED_THD may also be separately coded in sequence level, picture level, slice level, or PU level. In some embodiments, the selected or identified shared sub-tree root is required to be entirely inside the current picture. If the sub-tree root has some pixels outside the picture boundary, the sub-tree will not be used as the shared sub-tree root.

In some embodiments, the root CU (or the parent CU) or the size/depth/shape/width/height of the shared boundary is used to derive the shared candidate list. When deriving the shared candidate list, for any position based derivation, (e.g. deriving the reference block position according to the current block/CU/PU position/size/depth/shape/width/height), the root CU or the position and shape/size/depth/width/height of the shared boundary is used.

In some embodiments, the size/depth/shape/area/width/height of the root CU or the shared boundary may be predefined or signaled in sequence/picture/slice/tile/CTU-row-level or a predefined area (e.g. CTU or CTU row). The root CU or the shared boundary of the shared candidate list can be square or non-square. The size/depth/shape/area/width/height of the root CU or the shared boundary can be predefined and/or dependent on the size/depth/width/height of the input picture.

In some embodiments, if the current CU is larger than or equal to a defined threshold area/size/shape/area/width/height and one of the child partitions or all of the child partitions or some of the child partitions is smaller than the defined threshold area/size/shape/area/width/height, then the current CU is the root CU or the shared boundary. In some embodiments, if the depth of the current CU is smaller (e.g., shallower) than or equal to the defined threshold depth and the depth of one of the child partitions or all of the child partitions or some of the child partitions is/are larger (e.g., deeper) than the defined threshold depth, the current CU is the root CU or the shared boundary.

In some embodiments, if the current CU is smaller than or equal to the defined threshold area/size/shape/area/width/height and the parent CU of the current CU is larger than the defined threshold area/size/shape/area/width/height, the current CU is the root CU of the shared candidate list (i.e., the shared boundary). For example, if the defined threshold area is 1024 and a current CU size is 64×32 (width is 64 and height is 32), and the vertical TT split is used (the 64×32 CU is partitioned into a 16×32 sub-CU, a 32×32 sub-CU, and a 16×32 sub-CU), in one embodiment, the 64×32 current CU is the root CU. The child CUs in this 64×32 CU use the share candidate list based on the 64×32 CU. The 64×32 current CU may not identified as the root CU. Instead, the 16×32 sub-CU, the 32×32 sub-CU, and the 16×32 sub-CU are identified as root CUs. In some embodiments, if the depth of the current CU is larger (e.g., deeper) than or equal to a defined depth and the parent CU is smaller (e.g., shallower) than the defined depth, the current CU is the root CU.

In some embodiments, when performing the TT split on a current CU into three different sized partitions, a root CU or a shared boundary area/size/depth/shape/area/width/height may be different in the different TT partitions. For example, for a current CU that is partitioned into first, second, and third partitions by TT, for the second partition, the threshold of the root CU or the shared boundary area/size/depth/shape/area/width/height is the same as the CU. However, for the first and the third partitions, the threshold of (or for identifying) the root CU or the shared boundary area/size/shape/area/width/height can be divided by 2 (or depth increased by 1) relative to that of the second partition.

In some embodiments, the root CU or the shared boundary is defined for QT partitions or the QT split CUs. If a leaf QT CU is equal to or larger than the defined threshold area/size/QT-depth/shape/area/width/height, the root CU or the shared boundary is identified or defined as the leaf QT CU area/size/QT-depth/shape/area/width/height. All the sub-CUs (e.g. portioned or partitioned by BT or TT) inside the QT leaf CU use the QT leaf CU as root CU or shared boundary. If a QT CU (not a QT leaf CU) is equal to the defined threshold area/size/QT-depth/shape/area/width/height, this QT CU is used as the root CU or shared boundary. All the sub-CUs (e.g. portioned or partitioned by QT, BT, or TT) inside the QT CU use the QT CU as root CU or shared boundary. In one example, the area/size/QT-depth/shape/area/width/height of the root CU or shared boundary is used to derive the reference block position. In another example, the area/size/QT-depth/shape/area/width/height of the current CU is used to derive the reference block position. If the reference block position is inside of the root CU or shared boundary, the reference block position is moved outside of the root CU or shared boundary. In another example, the area/size/QT-depth/shape/area/width/height of the current CU is used to derive the reference block position. If the reference block position is inside of the root CU or shared boundary, the reference block is not used.

In the above mentioned depth (or the defined threshold depth for identifying the root CU or shared boundary of shared candidate list), the depth can be equal to $(((A*QT\text{-}depth)\gg C)+((B*MT\text{-}depth)\gg D)+E)\gg F+G$ or $(((A*QT\text{-}depth)\gg C)+((B*BT\text{-}depth)\gg D)+E)\gg F+G$, where the A, B, C, D, E, F, G are integers. For example, depth can be equal to 2*QT-depth+MT-depth or 2*QT-depth+BT-depth or QT-depth+MT-depth or QT-depth+BT-depth.

Some embodiments provide a threshold definition (or a method for defining the threshold) for shared candidate list or non-square merge estimation region (MER). Let the shared candidate (or MER) threshold be denoted as T. The shared boundary is an ancestor (e.g., parent) node in CU splitting tree, denoted as ANC_NODE. The shared boundary (or ANC_NODE) is chosen to satisfy these conditions:

Condition 1: (size of) ANC_NODE<=T

Condition 2: (size of) Parent of ANC_NODE>T

Condition 3: the pixels of ANC_NODE lie inside the current picture boundary. The video coder search for ANC_NODE that meet these conditions by either: (i) searching from leaf CU tracing back (on the splitting tree) to the CTU root, or (ii) searching from the CTU root tracing down (on the splitting tree) to the leaf CU. In some embodiments, condition 2 may not exist. If the Leaf CU is near the picture boundary, if for one node, condition 1 & 2 met, but condition 3 is not met, this node will not be the ANC_NODE and the video coder proceeds to child CUs to search for the ANC_NODE.

In some embodiments, the determination of ANC_NODE is a searching process that start from CTU root tracing down (on the splitting tree) to the leaf CU, and the shared boundary (or ANC_NODE) is chosen to satisfy these conditions:

Condition 1: (size of) ANC_NODE>=T.

Condition 2: For decoding, one splitting child (e.g. BT split or TT split or QT split) size<T.

Condition 3: the pixels of ANC_NODE lie inside the current picture boundary. In some embodiments, the condition 1 may not exist. If the Leaf CU is near the picture boundary, if for one node, condition 1 & 2 met, but condition 3 is not met, this node will not be identified as ANC_NODE and the video coder proceeds to child CUs to search for the ANC_NODE. For condition 2, the smallest splitting child for current CU (if current CU size=cur_size) is: for QT: cur_size/4, for TT: cur_size/4, for BT: cur_size/2. In some embodiments, if conditions 1 and 2 are satisfied but condition 3 is not satisfied, the current CU is not the ANC_NODE and the video coder proceeds to child CUs to search for a node or child CU at which conditions 1, 2, and 3 are met for ANC_NODE. If conditions 1, 2, and 3 are not all satisfied for the leaf CU, this leaf CU will not have shared mode (e.g., no shared candidate list) and the video coder generates merge mode list for the leaf CU itself. For example, if T=64 and the current node or CU is size 128, if on the decoder side, this node is further split into TT (child 1 is 32, child 2 is 64, child 3 is 32), then, the ANC_NODE is the current node (size 128). For another example, if the T=64 and the current node or CU is size 128, if on the decoder side, this node is further split into BT (child 1 is 64, child 2 is 64), then, the current node is not ANC_NODE.

Figure 16:
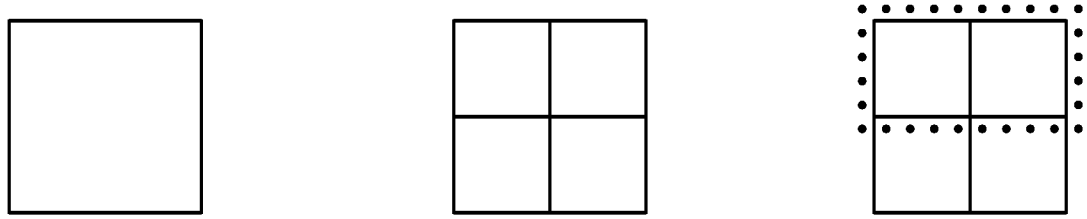
FIG. 16 illustrates an example of Group of CU nodes.

In some embodiments, the shared boundary is a Group of CU node for one ancestor (parent) node in CU splitting tree, denoted as SHARED_BOUND. The "Group of CU nodes" are several non-overlapping CUs/nodes (among CU splitting tree nodes) that belong to one common parent node or one common ancestor node, and those CU nodes can combine into one rectangular region. In one embodiment, the CUs of the Group of CU nodes must all be "1 level" child of the common parent node. In some embodiment, the CUs of the Group of CU nodes may have the same ancestor node, but not necessarily an "1 level" common parent. FIG. 16 illustrates an example of "Group of CU nodes". In the figure, the "Group of CU nodes" has 2 child CUs to occupy a half of parent node. The determination of SHARED_BOUND is a process of searching from CTU root tracing down (on the splitting tree) to the leaf CU. The shared boundary (or SHARED_BOUND) is chosen to satisfy these conditions:

Condition 1: (size of) SHARED_BOUND>=T.
Condition 2: For decoding, one CU node inside the "Group of CU nodes" is <T.
Condition 3: the pixels of SHARED_BOUND lie inside the current picture boundary. In some embodiments, condition 1 may not exist near picture boundary. This is because if the Leaf CU is near the picture boundary, in order to satisfy condition 3, condition 1 may be waived or given up near picture boundary.

In some embodiments, the shared list concept may apply to CPR. The merge list of the CPR can be shared and generated on the shared boundary or root CU (here the shared boundary means the shared root boundary or shared rectangular boundary). The merge list may include CPR candidate or non-CPR candidates, but the shared list can store both types and generated on the shared boundary.

For dual-tree flow in CPR, in some cases luma will run a leaf CU scanning and chroma will run again, i.e., leaf CU scanning is performed for both luma and chroma. In this case the shared boundary of luma case and chroma case may be different. In some embodiments, the shared list for CPR for luma case is generated, and then the shared list for CPR for chroma case is generated. That is, the shared threshold of luma and chroma can be different and the shared boundary of them can be different. For Multi-hypothesis merge (multi-hypothesis: merge inter+intra, or merge inter+merge inter, or merge inter+AMVP inter), post processing is performed on the merge list to remove all CPR candidates. The removal of CPR candidates (from the shared candidate list) may also be performed on the shared boundary.

Some embodiments provide a shared merge index and a shared reference index for merge mode based on the shared candidate list. A "child CU for sharing" may refer to a CU inside a sub-tree or inside the "shared boundary" that uses the shared candidate list.

For using the shared merge index, in merge mode, not only the merge candidate list of each "child CU for sharing" is equal with each other (using shared merge candidate list), but also the final selected merge index of each "child CU for sharing" is equal with each other (using a shared merge candidate index). For using the shared reference index for merge mode, in merge mode, not only the merge candidate list of each "child CU for sharing" is equal with each other (using shared merge candidate list), each "child CU for sharing" selects the merge index for which the corresponding candidate has the reference index equal to the selected merge index of all other CUs of the "child CU for sharing".

For some embodiments, the shared candidate list, the shared merge index and other shared-attribute methods may be applied to other type of merge list construction method, such as History based merge mode construction, and Non-adjacent merge candidate. That is, the shared-attribute proposal or the shared candidate list is generally applicable to all merge mode algorithm and AMVP mode algorithm. Moreover, in some embodiments, a flag is signaled to switch on or off for the candidate list sharing methods. In some embodiments, a flag may be signaled to indicate whether shared candidate list is enabled. The minimum sizes of units in the signaling, can also be separately coded in sequence level, picture level, slice level, or PU level.

IV. Example Video Encoder

Figure 17:
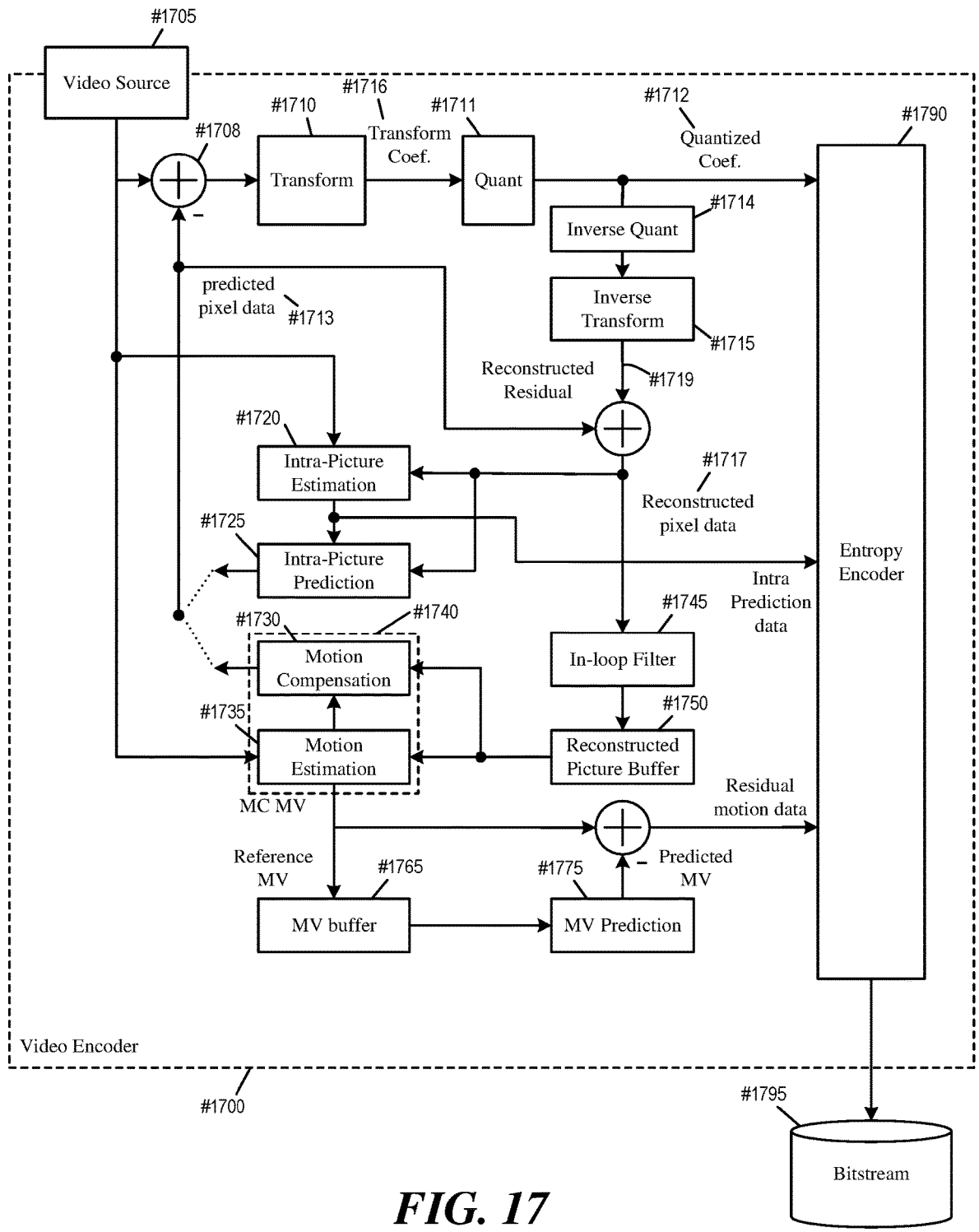
FIG. 17 illustrates an example video encoder that may use a shared candidate list to encode multiple CUs within a CTU.

FIG. 17 illustrates an example video encoder 1700 that may use a shared candidate list to encode multiple CUs within a CTU. As illustrated, the video encoder 1700 receives input video signal from a video source 1705 and encodes the signal into bitstream 1795. The video encoder 1700 has several components or modules for encoding the signal from the video source 1705, at least including some components selected from a transform module 1710, a quantization module 1711, an inverse quantization module 1714, an inverse transform module 1715, an intra-picture estimation module 1720, an intra-prediction module 1725, a motion compensation module 1730, a motion estimation module 1735, an in-loop filter 1745, a reconstructed picture buffer 1750, a MV buffer 1765, and a MV prediction module 1775, and an entropy encoder 1790. The motion compensation module 1730 and the motion estimation module 1735 are part of an inter-prediction module 1740.

In some embodiments, the modules 1710-1790 are modules of software instructions being executed by one or more processing units (e.g., a processor) of a computing device or electronic apparatus. In some embodiments, the modules 1710-1790 are modules of hardware circuits implemented by one or more integrated circuits (ICs) of an electronic apparatus. Though the modules 1710-1790 are illustrated as being separate modules, some of the modules can be combined into a single module.

The video source 1705 provides a raw video signal that presents pixel data of each video frame without compression. A subtractor 1708 computes the difference between the raw video pixel data of the video source 1705 and the predicted pixel data 1713 from the motion compensation module 1730 or intra-prediction module 1725. The transform module 1710 converts the difference (or the residual pixel data or residual signal 1709) into transform coefficients (e.g., by performing Discrete Cosine Transform, or DCT). The quantization module 1711 quantizes the transform coefficients into quantized data (or quantized coefficients) 1712, which is encoded into the bitstream 1795 by the entropy encoder 1790.

The inverse quantization module 1714 de-quantizes the quantized data (or quantized coefficients) 1712 to obtain transform coefficients, and the inverse transform module 1715 performs inverse transform on the transform coefficients to produce reconstructed residual 1719. The reconstructed residual 1719 is added with the predicted pixel data 1713 to produce reconstructed pixel data 1717. In some embodiments, the reconstructed pixel data 1717 is temporarily stored in a line buffer (not illustrated) for intra-picture prediction and spatial MV prediction. The reconstructed pixels are filtered by the in-loop filter 1745 and stored in the reconstructed picture buffer 1750. In some embodiments, the reconstructed picture buffer 1750 is a storage external to the video encoder 1700. In some embodiments, the reconstructed picture buffer 1750 is a storage internal to the video encoder 1700.

The intra-picture estimation module 1720 performs intra-prediction based on the reconstructed pixel data 1717 to produce intra prediction data. The intra-prediction data is provided to the entropy encoder 1790 to be encoded into bitstream 1795. The intra-prediction data is also used by the intra-prediction module 1725 to produce the predicted pixel data 1713.

The motion estimation module 1735 performs inter-prediction by producing MVs to reference pixel data of previously decoded frames stored in the reconstructed picture buffer 1750. These MVs are provided to the motion compensation module 1730 to produce predicted pixel data.

Instead of encoding the complete actual MVs in the bitstream, the video encoder 1700 uses MV prediction to generate predicted MVs, and the difference between the MVs used for motion compensation and the predicted MVs is encoded as residual motion data and stored in the bitstream 1795.

The MV prediction module 1775 generates the predicted MVs based on reference MVs that were generated for encoding previously video frames, i.e., the motion compensation MVs that were used to perform motion compensation. The MV prediction module 1775 retrieves reference MVs from previous video frames from the MV buffer 1765. The video encoder 1700 stores the MVs generated for the current video frame in the MV buffer 1765 as reference MVs for generating predicted MVs.

The MV prediction module 1775 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1795 by the entropy encoder 1790.

The entropy encoder 1790 encodes various parameters and data into the bitstream 1795 by using entropy-coding techniques such as context-adaptive binary arithmetic coding (CABAC) or Huffman encoding. The entropy encoder 1790 encodes various header elements, flags, along with the quantized transform coefficients 1712, and the residual motion data as syntax elements into the bitstream 1795. The bitstream 1795 is in turn stored in a storage device or transmitted to a decoder over a communications medium such as a network.

The in-loop filter 1745 performs filtering or smoothing operations on the reconstructed pixel data 1717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 18:
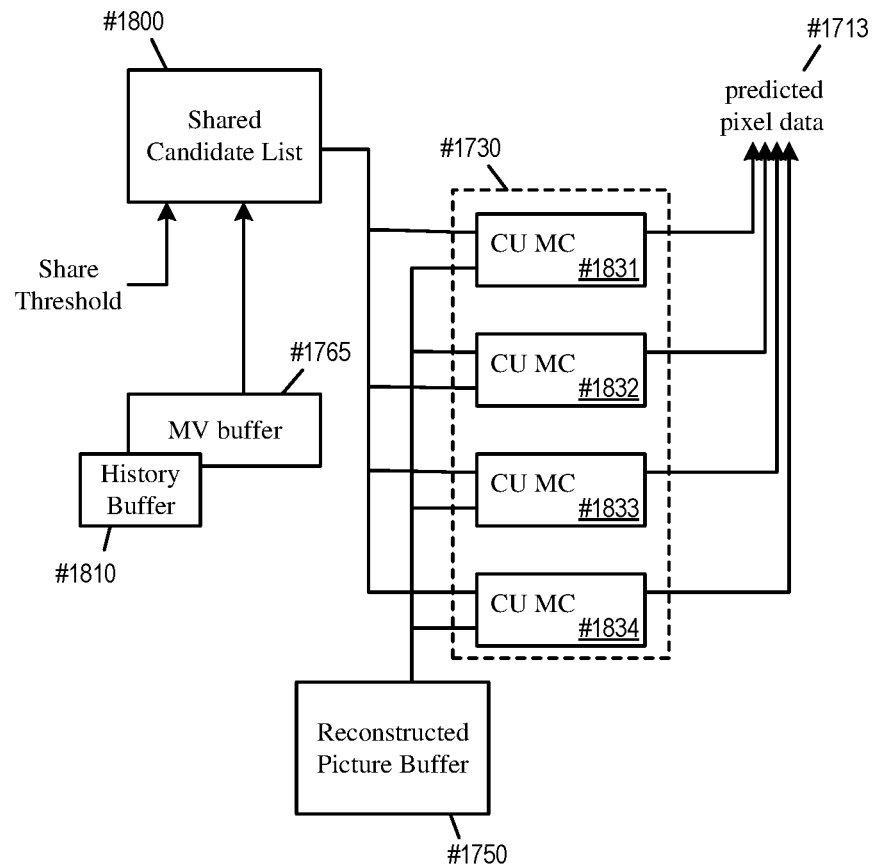
FIG. 18 illustrates portions of the video encoder that implement a shared candidate list.

FIG. 18 illustrates portions of the video encoder 1700 that implement a shared candidate list. As illustrated the motion compensation module 1730 includes one or more CU motion compensation modules 1831-1834. Each CU motion compensation module handles the encoding of one leaf CU. The CU motion compensation modules 1831-1834 may access the content of a shared candidate list 1800 when encoding their respective CUs as well as the content of the reconstructed picture buffer 1750. Each CU motion compensation module selects a prediction candidate from the shared candidate list and retrieves the corresponding samples from the reconstructed picture buffer 1750 to perform prediction by motion compensation. The predictions from the different CU motion compensation modules 1831-1834 are used as the predicted pixel data 1713.

It is important to note that the different CU compensation modules 1831-1834 may perform motion compensation of their respective CUs in parallel, even if the CUs being coded are neighbors of each other. This is because the CUs that use the shared candidate list do not have dependencies with each other and may be encoded at the same time.

The content of the shared candidate list 1800 are retrieved from the MV buffer 1765, which stores motion vectors of various neighbors of a region defined by a shared boundary that may correspond to a root CU or a sub-tree of a CTU. The motion vectors being included by the shared candidate list 1800 from the MV buffer 1765 may include merge or AMVP candidates of various types, such as affine candidates, IBC candidates, sub-PU candidates, history-based candidates, non-adjacent candidates, etc. The history-based candidates may be stored in a history buffer 1810, which is a FIFO that stores merge candidates of previously encoded CUs.

Figure 19:
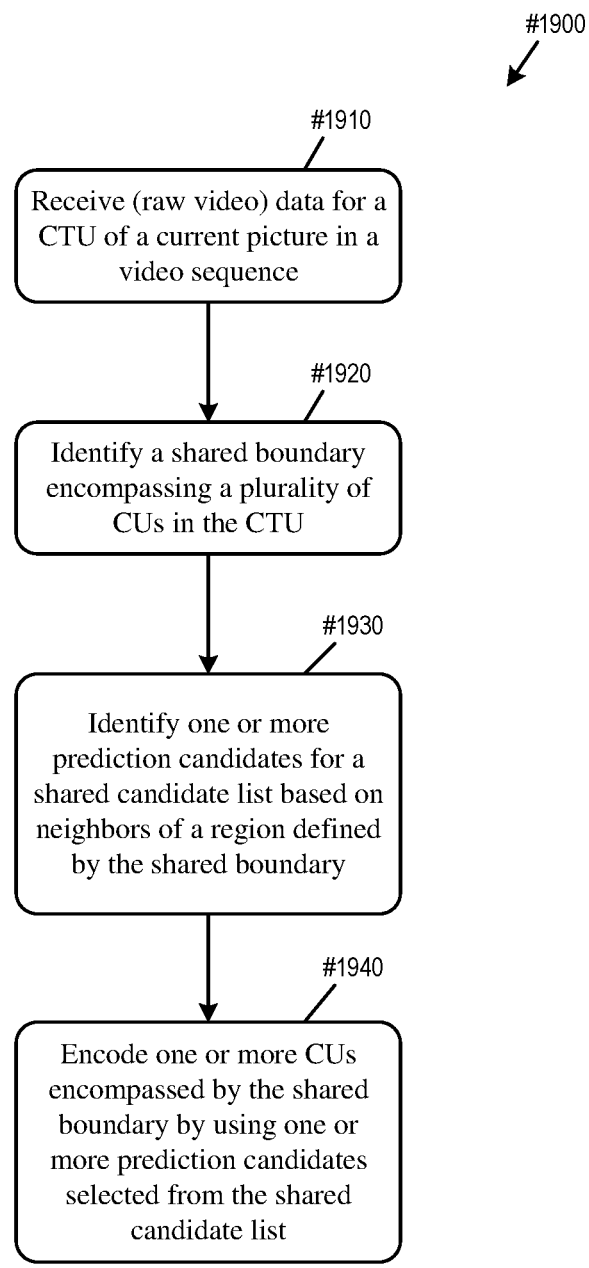
FIG. 19 conceptually illustrates a process for using a shared candidate list to encode multiple CUs.

FIG. 19 conceptually illustrates a process 1900 for using a shared candidate list to encode multiple CUs. In some embodiments, one or more processing units (e.g., a processor) of a computing device implementing the encoder 1700 performs the process 1900 by executing instructions stored in a computer readable medium. In some embodiments, an electronic apparatus implementing the video encoder 1700 performs the process 1900.

The video encoder receives (at step 1910) data for a CTU of a current picture in a video sequence. The data may be raw pixel data from a video source for an area in the current picture that correspond to the CTU. The CTU may be split as a QT, BT, or TT split tree into CUs or sub-CUs.

The video encoder identifies (at step 1920) a shared boundary encompassing multiple CUs (or blocks of pixels) in the CTU. The shared boundary may correspond to a root of a sub-tree of the CTU. The shared boundary may be identified based on a CU size threshold (SHARED_THD). In some embodiments, the shared boundary is identified by traversing the CTU to identify a CU that is larger than or equal to the CU size threshold and that the CU is a parent CU to a child CU that is smaller than the threshold. In some embodiments, the shared boundary is identified by traversing the CTU to identify a CU that is smaller than or equal to the CU size threshold and that the CU is a child CU to a parent CU that is larger than the threshold. The boundary of the identified CU is then defined to be the shared boundary.

The video encoder identifies (at step 1930) one or more prediction candidates for a shared candidate list based on the spatial or temporal neighbors of a region defined by the shared boundary. The region may correspond to a CU and the shared candidate list may be used as a merge candidate list of the CU. The motion vectors being included by the shared candidate list may include merge or AMVP candidates of various types, such as affine candidates, IBC candidates, sub-PU candidates, history-based candidates, non-adjacent candidates, etc.

The video encoder encodes (at step 1940) one or more CUs encompassed by the shared boundary by using one or more prediction candidates selected from the shared candidate list. The selected prediction candidate is used to perform motion compensation prediction. The CUs being encoded are leaf CUs of the CTU. In some embodiments, not all leaf CUs within the shared boundary use the shared candidate list for encoding, but rather only leaf CUs that have the same characteristics as the root CU may use the shared candidate list for encoding. The encoded CUs are stored in a bitstream as code bits for syntax elements.

V. Example Video Decoder

Figure 20:
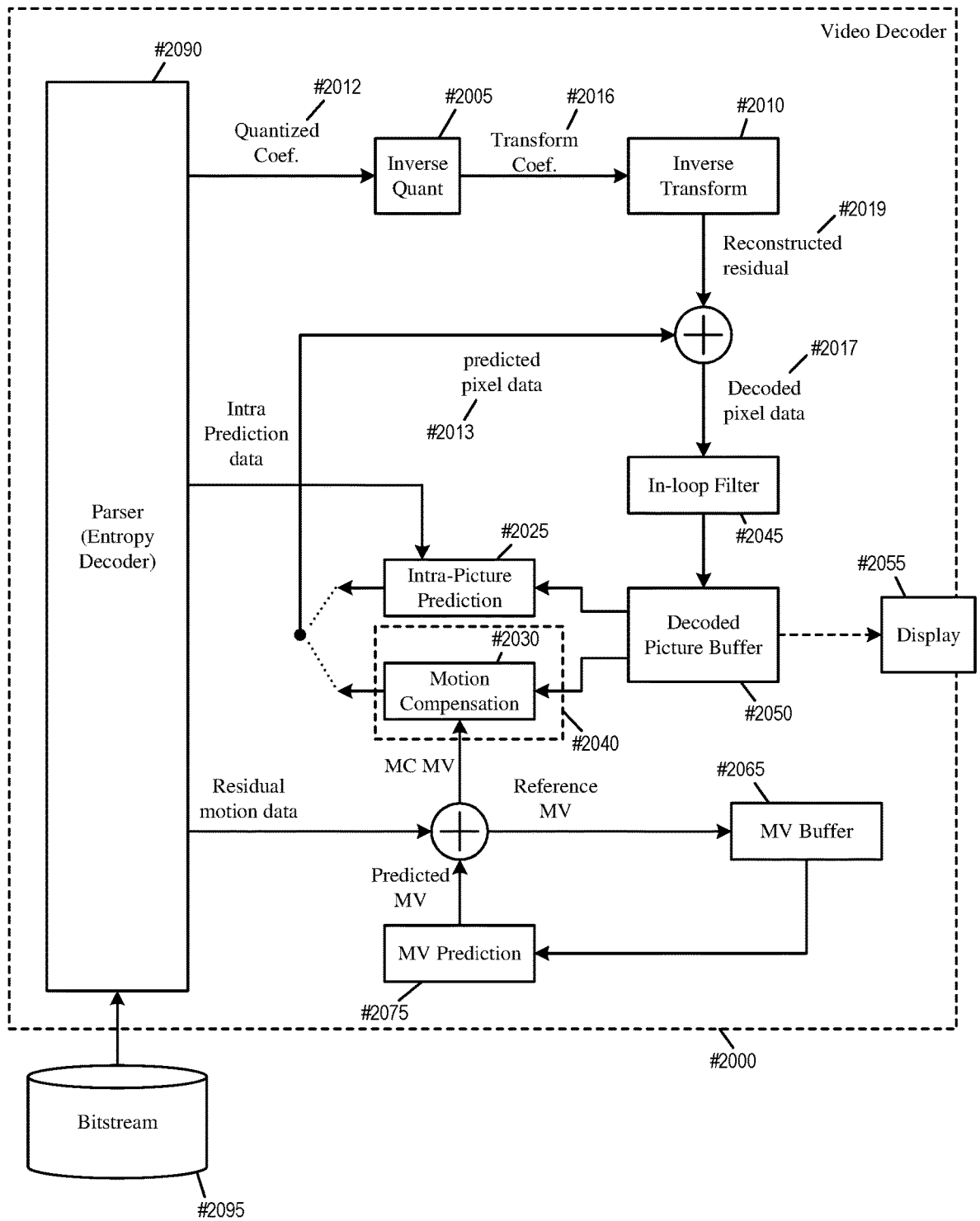
FIG. 20 illustrates an example video decoder that implement a shared candidate list.

FIG. 20 illustrates an example video decoder 2000 that implement a shared candidate list. As illustrated, the video decoder 2000 is an image-decoding or video-decoding circuit that receives a bitstream 2095 and decodes the content of the bitstream into pixel data of video frames for display. The video decoder 2000 has several components or modules for decoding the bitstream 2095, including some components selected from an inverse quantization module 2005, an inverse transform module 2010, an intra-prediction module 2025, a motion compensation module 2030, an in-loop filter 2045, a decoded picture buffer 2050, a MV buffer 2065, a MV prediction module 2075, and a parser 2090. The motion compensation module 2030 is part of an inter-prediction module 2040.

In some embodiments, the modules 2010-2090 are modules of software instructions being executed by one or more processing units (e.g., a processor) of a computing device. In some embodiments, the modules 2010-2090 are modules of hardware circuits implemented by one or more ICs of an electronic apparatus. Though the modules 2010-2090 are illustrated as being separate modules, some of the modules can be combined into a single module.

The parser 2090 (or entropy decoder) receives the bitstream 2095 and performs initial parsing according to the syntax defined by a video-coding or image-coding standard. The parsed syntax element includes various header elements, flags, as well as quantized data (or quantized coefficients) 2012. The parser 2090 parses out the various syntax elements by using entropy-coding techniques such as context-adaptive binary arithmetic coding (CABAC) or Huffman encoding.

The inverse quantization module 2005 de-quantizes the quantized data (or quantized coefficients) 2012 to obtain transform coefficients, and the inverse transform module 2010 performs inverse transform on the transform coefficients 2016 to produce reconstructed residual signal 2019. The reconstructed residual signal 2019 is added with predicted pixel data 2013 from the intra-prediction module 2025 or the motion compensation module 2030 to produce decoded pixel data 2017. The decoded pixels data are filtered by the in-loop filter 2045 and stored in the decoded picture buffer 2050. In some embodiments, the decoded picture buffer 2050 is a storage external to the video decoder 2000. In some embodiments, the decoded picture buffer 2050 is a storage internal to the video decoder 2000.

The intra-prediction module 2025 receives intra-prediction data from bitstream 2095 and according to which, produces the predicted pixel data 2013 from the decoded pixel data 2017 stored in the decoded picture buffer 2050. In some embodiments, the decoded pixel data 2017 is also stored in a line buffer (not illustrated) for intra-picture prediction and spatial MV prediction.

In some embodiments, the content of the decoded picture buffer 2050 is used for display. A display device 2055 either retrieves the content of the decoded picture buffer 2050 for display directly or retrieves the content of the decoded picture buffer to a display buffer. In some embodiments, the display device receives pixel values from the decoded picture buffer 2050 through a pixel transport.

The motion compensation module 2030 produces predicted pixel data 2013 from the decoded pixel data 2017 stored in the decoded picture buffer 2050 according to motion compensation MVs (MC MVs). These motion compensation MVs are decoded by adding the residual motion data received from the bitstream 2095 with predicted MVs received from the MV prediction module 2075.

The MV prediction module 2075 generates the predicted MVs based on reference MVs that were generated for decoding previous video frames, e.g., the motion compensation MVs that were used to perform motion compensation. The MV prediction module 2075 retrieves the reference MVs of previous video frames from the MV buffer 2065. The video decoder 2000 stores the motion compensation MVs generated for decoding the current video frame in the MV buffer 2065 as reference MVs for producing predicted MVs.

The in-loop filter 2045 performs filtering or smoothing operations on the decoded pixel data 2017 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 21:
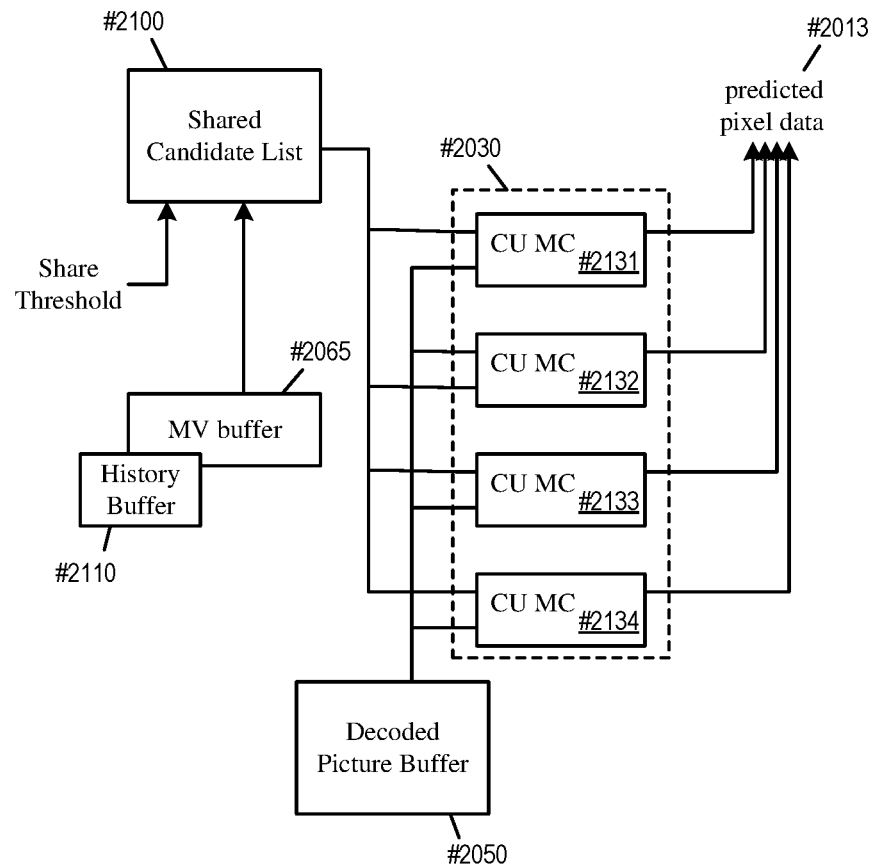
FIG. 21 illustrates portions of the video decoder that implement a shared candidate list.

FIG. 21 illustrates portions of the video decoder 2000 that implement a shared candidate list. As illustrated the motion compensation module 2030 includes one or more CU motion compensation modules 2131-2134. Each CU motion compensation module handles the decoding of one leaf CU. The CU motion compensation modules 2131-2134 may access the content of a shared candidate list 2100 when decoding their respective CUs as well as the content of the decoded picture buffer 2050. Each CU motion compensation module selects a prediction candidate from the shared candidate list and retrieves the corresponding samples from the decoded picture buffer 2050 to perform prediction by motion compensation. The predictions from the different CU motion compensation modules 2131-2134 are used as the predicted pixel data 2013.

It is important to note that the different CU motion compensation modules 2131-2134 may perform motion compensation of their respective CUs in parallel, even if the CUs being coded are neighbors of each other. This is because the CUs that use the shared candidate list do not have dependencies with each other and may be decoded at the same time.

The content of the shared candidate list 2100 are retrieved from the MV buffer 2065, which stores motion vectors of various neighbors of a region defined by a shared boundary that may correspond to a root CU or a sub-tree of a CTU. The motion vectors being included by the shared candidate list 2100 from the MV buffer 2065 may include merge or AMVP candidates of various types, such as affine candidates, IBC candidates, sub-PU candidates, history-based candidates, non-adjacent candidates, etc. The history-based candidates may be stored in a history buffer 2110, which is a FIFO that stores merge candidates of previously decoded CUs.

Figure 22:
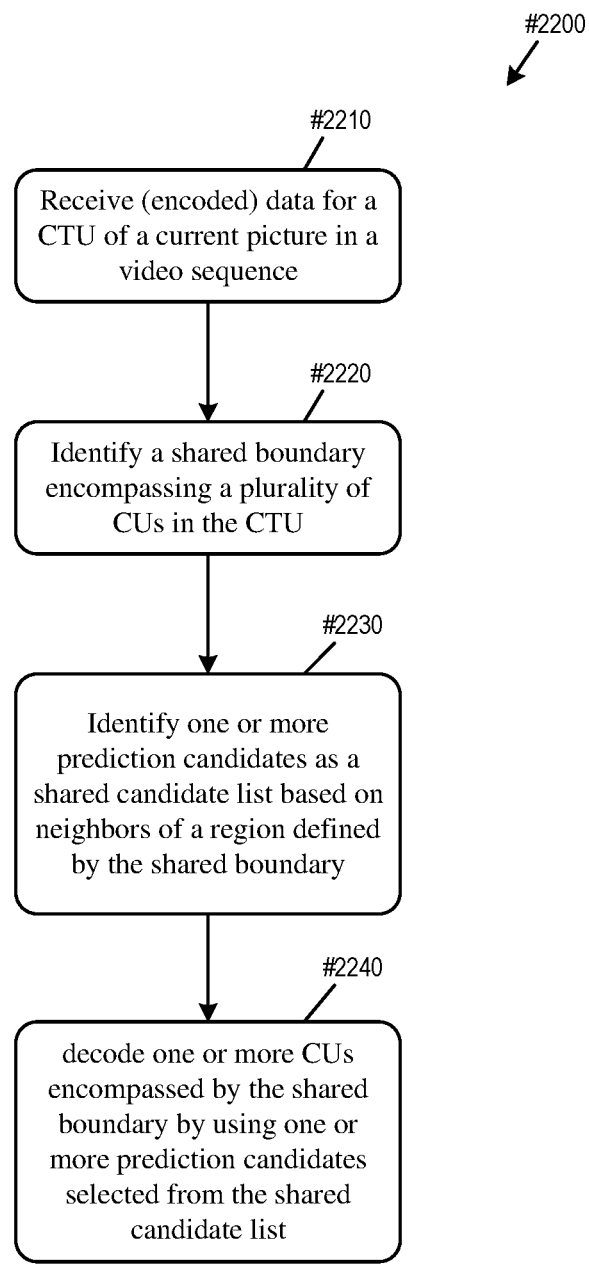
FIG. 22 conceptually illustrates a process for using a shared candidate list to decode multiple CUs.

FIG. 22 conceptually illustrates a process 2200 for using a shared candidate list to decode multiple CUs. In some embodiments, one or more processing units (e.g., a processor) of a computing device implementing the decoder 2000 performs the process 2200 by executing instructions stored in a computer readable medium. In some embodiments, an electronic apparatus implementing the video decoder 2000 performs the process 2200.

The video decoder receives (at step 2210) data for a CTU of a current picture in a video sequence. The data may be for blocks of pixels in the CTU that are encoded or generated in a bitstream as syntax elements. The CTU may be split as a QT, BT, or TT split tree into CUs or sub-CUs.

The video decoder identifies (at step 2220) a shared boundary encompassing multiple CUs (or blocks of pixels) in the CTU. The shared boundary may correspond to a root of a sub-tree of the CTU. The shared boundary may be identified based on a CU size threshold (SHARED_THD). In some embodiments, the shared boundary is identified by traversing the CTU to identify a CU that is larger than or equal to the CU size threshold and that the CU is a parent CU to a child CU that is smaller than the threshold. In some embodiments, the shared boundary is identified by traversing the CTU to identify a CU that is smaller than or equal to the CU size threshold and that the CU is a child CU to a parent CU that is larger than the threshold. The boundary of the identified CU is then defined to be the shared boundary.

The video decoder identifies (at step 2230) one or more prediction candidates for a shared candidate list based on the spatial or temporal neighbors of a region defined by the shared boundary. The region may correspond to a CU and the shared candidate list may be used as a merge candidate list of the CU. The motion vectors being included by the shared candidate list may include merge or AMVP candidates of various types, such as affine candidates, IBC candidates, sub-PU candidates, history-based candidates, non-adjacent candidates, etc.

The video decoder decodes (at step 2240) one or more CUs encompassed by the shared boundary by using one or more prediction candidates selected from the shared candidate list. The selected prediction candidate is used to perform motion compensation prediction. The CUs being decoded are leaf CUs of the CTU. In some embodiments, not all leaf CUs within the shared boundary use the shared candidate list for decoding, but rather only leaf CUs that have the same characteristics as the root CU may use the shared candidate list for decoding. The decoded CUs include pixel data that may be displayed.

VI. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 23:
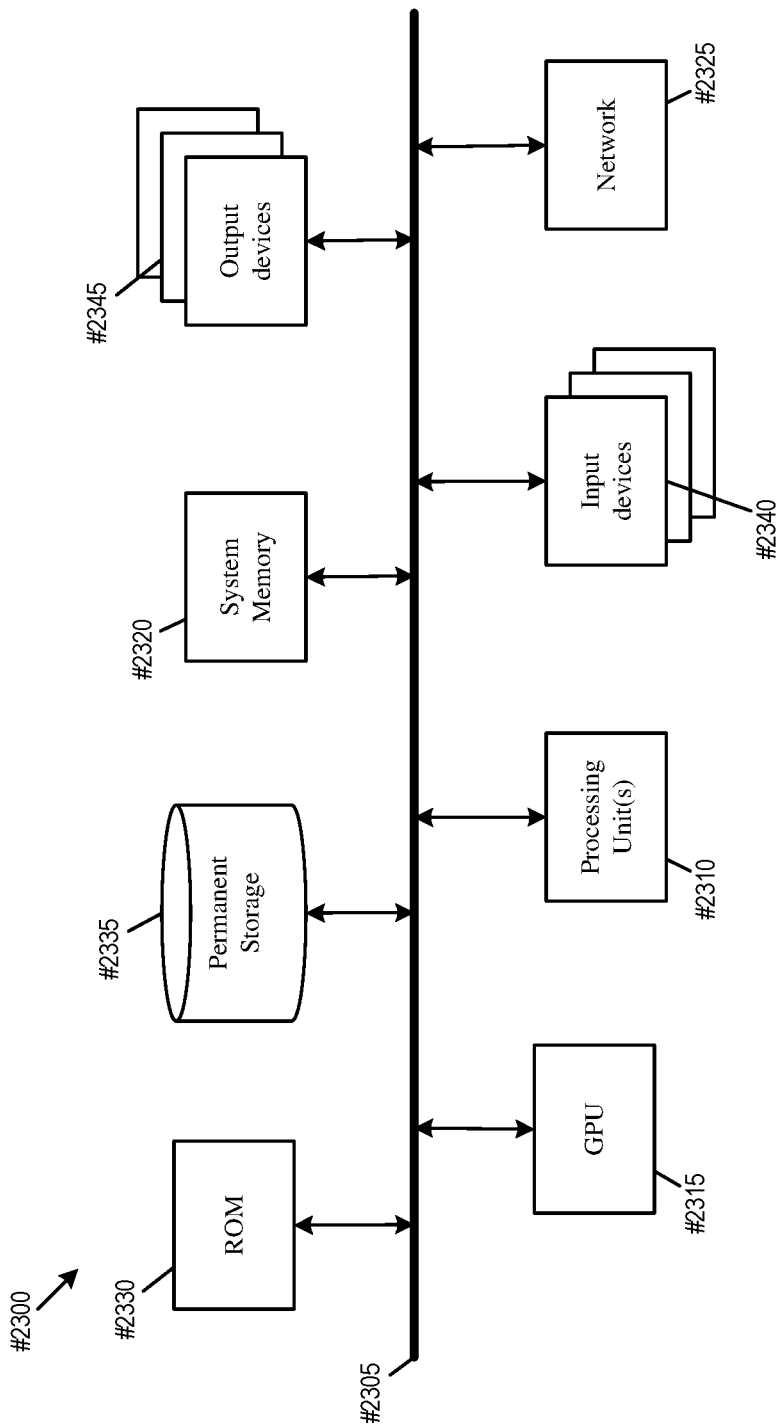
FIG. 23 conceptually illustrates an electronic system with which some embodiments of the present disclosure are implemented.

FIG. 23 conceptually illustrates an electronic system 2300 with which some embodiments of the present disclosure are implemented. The electronic system 2300 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2300 includes a bus 2305, processing unit(s) 2310, a graphics-processing unit (GPU) 2315, a system memory 2320, a network 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the GPU 2315, the read-only memory 2330, the system memory 2320, and the permanent storage device 2335.

From these various memory units, the processing unit(s) 2310 retrieves instructions to execute and data to process in order to execute the processes of the present disclosure. The processing unit(s) may be a single processor or a multi-core processor in different embodiments. Some instructions are passed to and executed by the GPU 2315. The GPU 2315 can offload various computations or complement the image processing provided by the processing unit(s) 2310.

The read-only-memory (ROM) 2330 stores static data and instructions that are used by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the present disclosure use a mass-storage device (such as a magnetic or optical disk and its corresponding disk drive) as the permanent storage device 2335.

Other embodiments use a removable storage device (such as a floppy disk, flash memory device, etc., and its corresponding disk drive) as the permanent storage device. Like the permanent storage device 2335, the system memory 2320 is a read-and-write memory device. However, unlike storage device 2335, the system memory 2320 is a volatile read-and-write memory, such a random access memory. The system memory 2320 stores some of the instructions and data that the processor uses at runtime. In some embodiments, processes in accordance with the present disclosure are stored in the system memory 2320, the permanent storage device 2335, and/or the read-only memory 2330. For example, the various memory units include instructions for processing multimedia clips in accordance with some embodiments. From these various memory units, the processing unit(s) 2310 retrieves instructions to execute and data to process in order to execute the processes of some embodiments.

The bus 2305 also connects to the input and output devices 2340 and 2345. The input devices 2340 enable the user to communicate information and select commands to the electronic system. The input devices 2340 include alphanumeric keyboards and pointing devices (also called "cursor control devices"), cameras (e.g., webcams), microphones or similar devices for receiving voice commands, etc. The output devices 2345 display images generated by the electronic system or otherwise output data. The output devices 2345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 23, bus 2305 also couples electronic system 2300 to a network 2325 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 19 and FIG. 22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    identifying a partition corresponds to a level in a hierarchical partitioning structure of a current picture according to a partition size threshold, a boundary of the identified partition encompassing a plurality of blocks of pixels of the current picture in a video sequence;
    constructing a shared candidate list to be shared by the plurality of blocks of pixels, the shared candidate list including one or more prediction candidates determined based on neighboring blocks of the identified partition; and
    coding one or more blocks of pixels of the plurality of blocks of pixels encompassed by the boundary of the identified partition by using one or more prediction candidates selected from the shared candidate list.

2. The method of claim 1, wherein coding the one or more blocks of pixels comprises coding a first block of pixels and a second block of pixels in parallel by using the shared candidate list.

3. The method of claim 1, wherein the identified partition is a portion of a coding tree unit (CTU) and corresponds to a root of a sub-tree of the CTU.

4. The method of claim 1, wherein the identified partition is a portion of a coding tree unit (CTU), and the plurality of blocks of pixels encompassed by the boundary of the identified partition correspond to leaf CUs of the CTU.

5. The method of claim 1, wherein the shared candidate list comprises motion vectors that are used for coding the neighboring blocks of the identified partition.

6. The method of claim 5, wherein at least one of the motion vectors refers to already-reconstructed reference samples in the current picture.

7. The method of claim 1, wherein the shared candidate list includes one or more candidates derived according to a merge mode.

8. The method of claim 1, wherein the shared candidate list includes one or more candidates derived according to a merge candidate of a previously coded CU.

9. The method of claim 1, wherein
    the hierarchical partitioning structure corresponds to a coding tree unit (CTU) of the current picture, and
    the identifying the partition comprises traversing the hierarchical partitioning structure to identify the partition that is larger than or equal to the partition size threshold, and that a child partition of the identified partition is smaller than the partition size threshold.

10. The method of claim 1, wherein
    the hierarchical partitioning structure corresponds to a coding tree unit (CTU) of the current picture, and
    the identifying the partition comprises traversing the hierarchical partitioning structure to identify the partition that is smaller than or equal to the partition size threshold, and that a parent partition of the identified partition is larger than the partition size threshold.

11. An electronic apparatus, comprising:
    a decoder circuit configured to perform operations comprising:
        receiving data for a coding tree unit (CTU) of a current picture in a video sequence;
        identifying a partition corresponds to a level in a hierarchical partitioning structure of the CTU according to a partition size threshold, a boundary of the identified partition encompassing a plurality of coding units (CUs) in the CTU;
        constructing a shared candidate list to be shared by the plurality of blocks of pixels, the shared candidate list including one or more prediction candidates determined based on neighboring CUs of the identified partition; and
        decoding one or more CUs of the plurality of CUs encompassed by the boundary of the identified partition by using one or more prediction candidates selected from the shared candidate list.

12. The electronic apparatus of claim 11, wherein the decoder circuit is configured to decode a first CU and a second CU of the plurality of CUs in parallel by using the shared candidate list.

13. The electronic apparatus of claim 11, wherein the identified partition corresponds to a root of a sub-tree of the CTU.

14. The electronic apparatus of claim 11, wherein the CUs encompassed by the boundary of the identified partition correspond to leaf CUs of the CTU.

15. The electronic apparatus of claim 11, wherein the shared candidate list comprises motion vectors that are used for coding the neighboring CUs of the identified partition.

16. The electronic apparatus of claim 15, wherein at least one of the motion vectors refers to already-reconstructed reference samples in the current picture.

17. The electronic apparatus of claim 11, wherein the shared candidate list includes one or more candidates derived according to a merge mode.

18. The electronic apparatus of claim 11, wherein the shared candidate list includes one or more candidates derived according to one or more merge candidates of a previously coded CU.

19. The electronic apparatus of claim 11, wherein the decoder circuit is configured to identify the partition by traversing the hierarchical partitioning structure of the CTU to identify the partition that is larger than or equal to the partition size threshold, and that a child partition of the identified partition is smaller than the partition size threshold.

20. The electronic apparatus of claim 11, wherein the decoder circuit is configured to identify the partition by traversing the hierarchical partitioning structure of the CTU to identify the partition that is smaller than or equal to the partition size threshold, and that a parent partition of the identified partition is larger than the partition size threshold.

21. An electronic apparatus comprising:
an encoder circuit configured to perform operations comprising:
receiving data for a coding tree unit (CTU) of a current picture in a video sequence;
identifying a partition corresponds to a level in a hierarchical partitioning structure of the CTU according to a partition size threshold, a boundary of the identified partition encompassing a plurality of coding units (CUs) in the CTU;
constructing a shared candidate list to be shared by the plurality of blocks of pixels, the shared candidate list including one or more prediction candidates determined based on neighboring CUs of the identified partition; and
encoding one or more CUs of the plurality of CUs encompassed by the boundary of the identified partition by using one or more prediction candidates selected from the shared candidate list.

22. The electronic apparatus of claim 21, wherein the encoder circuit is configured to identify the partition by traversing the hierarchical partitioning structure of the CTU to identify the partition that is larger than or equal to the partition size threshold, and that a child partition of the identified partition is smaller than the partition size threshold.

23. The electronic apparatus of claim 21, wherein the encoder circuit is configured to identify the partition by traversing the hierarchical partitioning structure of the CTU to identify the partition that is smaller than or equal to the partition size threshold, and that a parent partition of the identified partition is larger than the partition size threshold.

* * * * *